US011455352B2

(12) United States Patent
Vasudevan et al.

(10) Patent No.: US 11,455,352 B2
(45) Date of Patent: *Sep. 27, 2022

(54) RECOMMENDING CONTENTS USING A BASE PROFILE

(71) Applicant: YAHOO ASSETS LLC, Dulles, VA (US)

(72) Inventors: Sudharsan Vasudevan, Santa Clara, CA (US); Herat Gandhi, Sunnyvale, CA (US); Mahesh Inturi, Sunnyvale, CA (US); Chinmayi Narasimhadevara, Fremont, CA (US); Sumit Ailawadi, Mountain View, CA (US)

(73) Assignee: YAHOO ASSETS LLC, Dulles, VA (US)

(*) Notice: Subject to any disclaimer, the term of this patent is extended or adjusted under 35 U.S.C. 154(b) by 183 days.

This patent is subject to a terminal disclaimer.

(21) Appl. No.: 16/010,567

(22) Filed: Jun. 18, 2018

(65) Prior Publication Data

US 2018/0300418 A1 Oct. 18, 2018

Related U.S. Application Data

(63) Continuation of application No. 14/529,415, filed on Oct. 31, 2014, now Pat. No. 10,025,863.

(51) Int. Cl.
*G06F 16/9535* (2019.01)

(52) U.S. Cl.
CPC .............................. *G06F 16/9535* (2019.01)

(58) Field of Classification Search
CPC ................................................. G06F 16/9535
See application file for complete search history.

(56) References Cited

U.S. PATENT DOCUMENTS

| 6,438,579 | B1 | 8/2002 | Hosken |
| 6,839,680 | B1* | 1/2005 | Liu ..................... G06Q 30/0204 |
| | | | 705/7.33 |
| 7,840,691 | B1* | 11/2010 | De Bonet ............... H04L 65/00 |
| | | | 709/231 |
| 8,589,434 | B2 | 11/2013 | Liebald |
| 8,655,695 | B1* | 2/2014 | Qu ..................... G06Q 30/0251 |
| | | | 705/14.49 |
| 8,762,302 | B1 | 6/2014 | Spivack |
| 9,037,516 | B2 | 5/2015 | Abhyanker |
| 9,330,174 | B1* | 5/2016 | Zhang ..................... G06F 16/95 |
| 9,344,815 | B2 | 5/2016 | Selig |
| 9,584,465 | B2 | 2/2017 | Arquette |
| 9,799,081 | B1* | 10/2017 | Lewis .................... G06Q 50/01 |
| 2003/0009497 | A1 | 1/2003 | Yu |
| 2007/0118498 | A1 | 5/2007 | Song |
| 2007/0264974 | A1 | 11/2007 | Frank |

(Continued)

*Primary Examiner* — Alford W Kindred
*Assistant Examiner* — Tiffany Thuy Bui
(74) *Attorney, Agent, or Firm* — Venable LLP

(57) ABSTRACT

A method and system for recommending content to a user whose interest(s) has not been identified is disclosed. A base user profile may be created for association with the user. The base user profile may be created by generating a list of ranked interests of a set of representative users. The list of ranked interests may be generated based on activity information obtained for the set of representative users. Content may be recommended to the user based on the base user profile.

19 Claims, 20 Drawing Sheets

(56) References Cited

U.S. PATENT DOCUMENTS

| | | |
|---|---|---|
| 2008/0077614 A1 | 3/2008 | Roy |
| 2008/0134043 A1* | 6/2008 | Georgis .................. H04N 7/10 |
| | | 715/733 |
| 2008/0222308 A1 | 9/2008 | Abhyanker |
| 2008/0281854 A1 | 11/2008 | Abhyanker |
| 2009/0077033 A1 | 3/2009 | McGary |
| 2009/0163183 A1 | 6/2009 | O'Donoghue |
| 2010/0070507 A1 | 3/2010 | Mori |
| 2010/0251305 A1 | 9/2010 | Kimble |
| 2011/0145040 A1 | 6/2011 | Zahn |
| 2011/0212770 A1 | 9/2011 | Osko |
| 2011/0302032 A1 | 12/2011 | Ishii |
| 2011/0302165 A1* | 12/2011 | Ishii ................... G06Q 30/0282 |
| | | 707/737 |
| 2012/0272160 A1 | 10/2012 | Spivack |
| 2013/0298038 A1 | 11/2013 | Spivack |
| 2014/0156681 A1 | 6/2014 | Lee |
| 2014/0223488 A1 | 8/2014 | Korst |
| 2014/0337451 A1 | 11/2014 | Choudhary |
| 2015/0020083 A1* | 1/2015 | Ben-Itzhak ............. G06F 9/543 |
| | | 719/320 |
| 2015/0081417 A1* | 3/2015 | Golden ............. G06Q 30/0242 |
| | | 705/14.41 |
| 2015/0112918 A1 | 4/2015 | Zheng |
| 2015/0256633 A1 | 9/2015 | Chand |
| 2015/0370798 A1 | 12/2015 | Ju |

* cited by examiner

Base Profile Builder

RECOMMENDING CONTENTS USING A BASE PROFILE

CROSS-REFERENCE TO RELATED APPLICATION

The present patent application claims priority to U.S. patent application Ser. No. 14/529,415 filed Oct. 31, 2014, which is incorporated herein by reference in its entirety.

BACKGROUND

1. Technical Field

The present teaching relates to providing content. Specifically, the present teaching relates to methods and systems for providing online content.

2. Discussion of Technical Background

The Internet has made it possible for a user to electronically access virtually any content at anytime and from any location. With the explosion of information, it has become more and more important to provide users with information that is relevant to the user and not just information in general. Further, as users of today's society rely on the Internet as their source of information, entertainment, and/or social connections, e.g., news, social interaction, movies, music, etc, it is critical to provide users with information they find valuable.

Efforts have been made to attempt to allow users to readily access relevant and on the point content. For example, topical portals have been developed that are more subject matter oriented as compared to generic content gathering systems such as traditional search engines. Example topical portals include portals on finance, sports, news, weather, shopping, music, art, film, etc. Such topical portals allow users to access information related to subject matters that these portals are directed to. Users have to go to different portals to access content of certain subject matter, which is not convenient and not user centric.

Another line of efforts in attempting to enable users to easily access relevant content is via personalization, which aims at understanding each user's individual likings/interests/preferences so that an individualized user profile for each user can be set up and can be used to select content that matches a user's interests. The underlying goal is to meet the minds of users in terms of content consumption. User profiles traditionally are constructed based on users' declared interests and/or inferred from, e.g., users' demographics. There have also been systems that identify users' interests based on observations made on users' interactions with content. A typical example of such user interaction with content is click through rate (CTR).

These traditional approaches have various shortcomings. For example, users' interests are profiled without any reference to a baseline so that the level of interest can be more accurately estimated. User interests are detected in isolated application settings so that user profiling in individual applications cannot capture a broad range of the overall interests of a user. Such traditional approach to user profiling lead to fragmented representation of user interests without a coherent understanding of the users' preferences. Because profiles of the same user derived from different application settings are often grounded with respect to the specifics of the applications, it is also difficult to integrate them to generate a more coherent profile that better represent the user's interests.

User activities directed to content are traditionally observed and used to estimate or infer users' interests. CTR is the most commonly used measure to estimate users' interests. However, CTR is no longer adequate to capture users' interests particularly given that different types of activities that a user may perform on different types of devices may also reflect or implicate user's interests. In addition, user reactions to content usually represent users' short term interests. Such observed short term interests, when acquired piece meal, as traditional approaches often do, can only lead to reactive, rather than proactive, services to users. Although short term interests are important, they are not adequate to enable understanding of the more persistent long term interests of a user, which are crucial in terms of user retention. Most user interactions with content represent short term interests of the user so that relying on such short term interest behavior makes it difficult to expand the understanding of the increasing range of interests of the user. When this is in combination with the fact that such collected data is always the past behavior and collected passively, it creates a personalization bubble, making it difficult, if not impossible, to discover other interests of a user unless the user initiates some action to reveal new interests.

Yet another line of effort to allow users to access relevant content is to pooling content that may be interested by users in accordance with their interests. Given the explosion of information on the Internet, it is not likely, even if possible, to evaluate all content accessible via the Internet whenever there is a need to select content relevant to a particular user. Thus, realistically, it is needed to identify a subset or a pool of the Internet content based on some criteria so that content can be selected from this pool and recommended to users based on their interests for consumption.

Conventional approaches to creating such a subset of content are application centric. Each application carves out its own subset of content in a manner that is specific to the application. For example, Amazon.com may have a content pool related to products and information associated thereof created/updated based on information related to its own users and/or interests of such users exhibited when they interact with Amazon.com. Facebook also has its own subset of content, generated in a manner not only specific to Facebook but also based on user interests exhibited while they are active on Facebook. As a user may be active in different applications (e.g., Amazon.com and Facebook) and with each application, they likely exhibit only part of their overall interests in connection with the nature of the application. Given that, each application can usually gain understanding, at best, of partial interests of users, making it difficult to develop a subset of content that can be used to serve a broader range of users' interests.

Another line of effort is directed to personalized content recommendation, i.e., selecting content from a content pool based on the user's personalized profiles and recommending such identified content to the user. Conventional solutions focus on relevance, i.e., the relevance between the content and the user. Although relevance is important, there are other factors that also impact how recommendation content should be selected in order to satisfy a user's interests. Most content recommendation systems insert advertisement to content identified for a user for recommendation. Some traditional systems that are used to identify insertion advertisements match content with advertisement or user's query (also content) with advertisement, without considering matching based on demographics of the user with features of the target audience defined by advertisers. Some traditional systems match user profiles with the specified demographics of the target audience defined by advertisers but without matching the content to be provided to the user and the advertisement. The reason is that content is often classified into taxonomy based on subject matters covered in the content yet advertisement taxonomy is often based on desired target audience groups. This makes it less effective in terms of selecting the most relevant advertisement to be inserted into content to be recommended to a specific user.

However, the afro-mentioned traditional methods for recommending content to users require identifying the users' interests as reflected by his/her user profile. That is, a given user's interest(s) has to be identified in order for the traditional methods to recommend contents to the given user. Such a requirement presents a problem or problems, at least, in situations where the given user's interests have not been identified. Such situations may arise when the given user is browsing the Internet anonymously, e.g., without identifying him/her-self by providing a username associated with his/her user profile. In another situation, even when the given user has identified him/her-self, there might not be enough information regarding the given user's interest(s) simply because the given user has not engaged in enough Internet activities.

There is a need for improvements over the conventional approaches to content recommendation.

SUMMARY

The teachings disclosed herein relate to recommending content using a base user profile. Particularly, the present teachings relate to recommending online content to a user whose interest(s) has not been identified using a base user profile determined from Internet activities engaged in by a set of representative users.

In one embodiment, a method for recommending content to a user is disclosed, the method is implemented on a computing device having at least one processor, storage, and a communication interface connected to a network. The method comprising determining information identifying interest(s) of a user does not yet exist; determining a base user profile to be associated with this user, the base user profile including interest information indicating one or more ranked interests regarding a set of representative users within a time period; and recommending content to the user based on the base user profile. In this method, determining the base user profile comprises selecting the set of representative users based one or more selection criteria; obtaining activity information regarding the selected set of representative users, the activity information indicating activities engaged by the set of representative users within a time period; and analyzing the obtained activity information regarding the selected set of representative users to determine the one or more ranked interests regarding the set of representative users within the time period.

In another embodiment, analyzing the obtained activity information regarding the selected set of representative users to determine the one or more ranked interests in the method further comprises extracting individual user activities from the activity information for the individual ones of the representative users in the set, weighting the extracted individual user activities based on one or more predetermined factors, aggregating the weighted individual user activities, and determining the one or more ranked interests based on the aggregated user activities.

In another embodiment, analyzing the obtained activity information in the method further comprises categorizing the extracted individual user activities by activity type, activity topic, one or more phrases associated with activity, and/or content viewed during activity, and wherein weighting the extracted individual user activities in the method comprises determining a score for the individual categories of the activities.

In another embodiment, recommending content to the user based on the obtained base user profile in the method comprises extracting one or more interests from the ranked interests indicated by the interest information included in the base user profile, obtaining a set of candidate content, analyzing the candidate content based on the one or more interests extracted, and selecting content for recommendation based on the result of the analysis In another embodiment, creating the base user profile further comprising selecting a number of ranked interests for inclusion in the base user profile based on the associated ranks.

In an embodiment, a non-transitory computer readable medium having recorded thereon information for recommending contents to users is disclosed. The medium, when read by a computer, causes the computer to perform the steps of identifying interest(s) of a user does not yet exist; determining a base user profile to be associated with this user, the base user profile including interest information indicating one or more ranked interests regarding a set of representative users within a time period; and recommending content to the user based on the base user profile.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
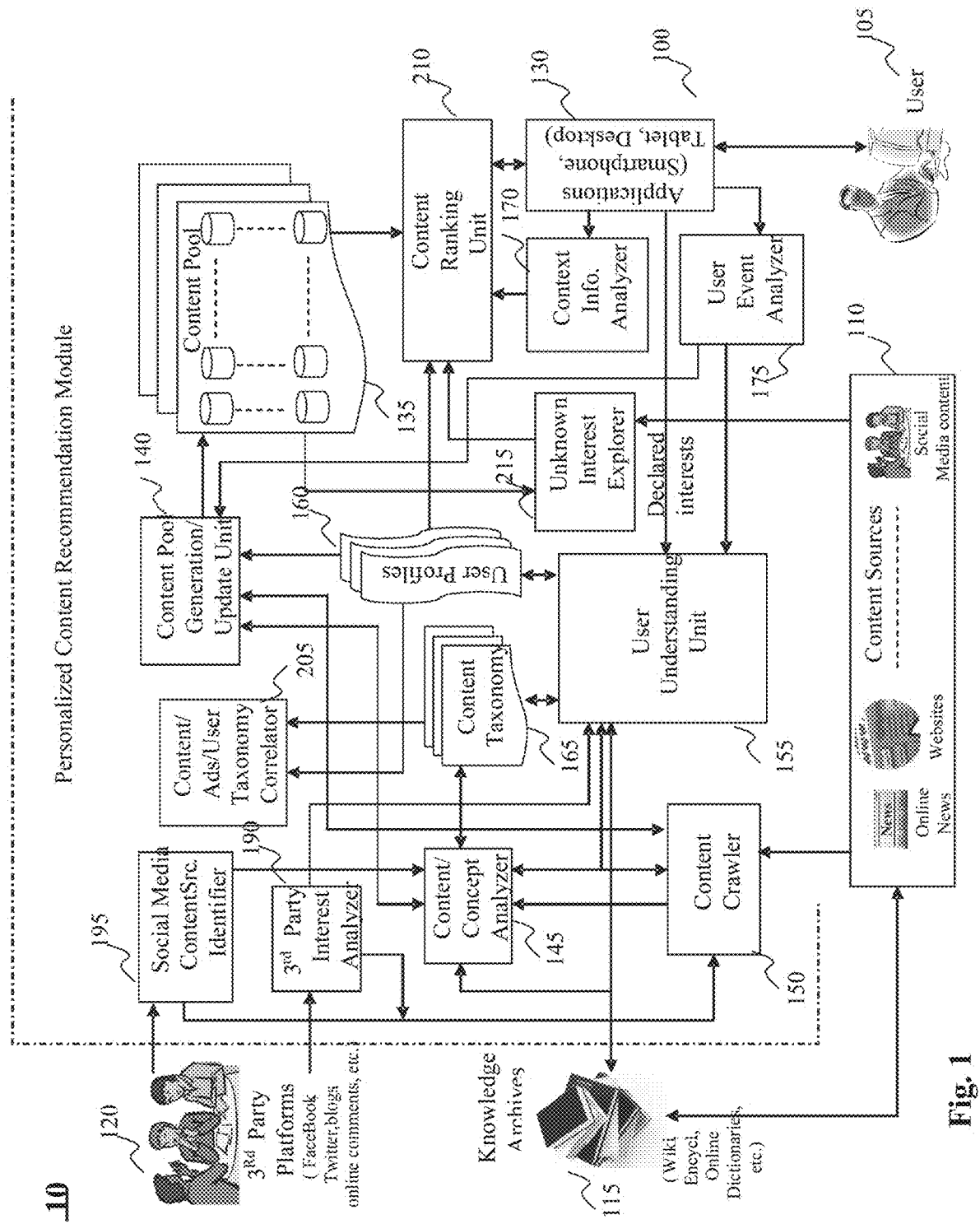
FIG. 1 depicts an exemplary system diagram for personalized content recommendation, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to recommending on-line content to a user. Particularly, the present teaching relates to a system, method, and/or programs for recommending content to a user that addresses the shortcomings associated the conventional content recommendation solutions.

In one aspect of the present teaching, for recommending content to a user whose interest(s) has not been identified, a base user profile may be associated with such a user. The base user profile may include information indicating a list of ranked interests of a set of representative users. The set of representative users may be selected based on one or more selection criteria, such as demographics, certain activity thresholds, interaction thresholds and/or any other selection criteria. For example, without limitation, the set of representative users may include top 100 most active users in terms of interaction with an Internet content system during a time period (e.g., the past month) in a locale (e.g., in UK). For such a set of representative users, activity information indicating activities performed by these users may be obtained. Based on the obtained activity information, interests of these users may be identified. In some examples, the identification of the interest of these users may be based on frequencies of activity occurrences by these users. For instance, in one implementation, articles viewed by these users within the predetermined time period (e.g., past month) may be identified, and analyzed to extract one or more individual phrases associated with the articles. The number of such phrases may be aggregated to generate a list of ranked interests of the representative users. Based on such a list of ranked interests, a base user profile may be generated to include one or more interests in the ranked list. Based on the base user profile, content may be recommended to the user in absence of his/her interest(s) being identified.

In another aspect of the present teaching, a set of representative users may be selected for generating a base user profile that may be used to recommend content. The quality of content recommendation may depend on the selection of the representative users. A range of selection criteria may be obtained for making such a selection. Some factors that may be taken into consideration may include desired demographics, activity level, experience level, and/or any other selection criteria.

In yet another aspect of the present teaching, content scores may be weighted to reflect qualities of content features with respect to the content items in which the content features are extracted, the individual users that consumed content features, and/or any other considerations. The content feature scores may be obtained based on its relevancy to the content items in which they are extracted. The content feature scores may be weighted based on metrics of the individual representative users that consumed content features, based on a level of interaction by the individual representative users when consuming the content features, and/or any other consideration.

The present teaching also discloses ways to improve the ability to estimate ranked interest(s) of the representative user based on a variety of activities of these users. This is especially useful because meaningful user activities often occur in different settings, on different devices, and in different operation modes. Through such different user activities, engagement to content by the representative users may be measured. Traditionally, clicks and click through rate (CTR) have been used to estimate users' intent and infer users' interests. CTR is simply not adequate in today's world. Users may dwell on a certain portion of the content, the dwelling may be for different lengths of time, users may scroll along the content and may dwell on a specific portion of the content for some length of time, users may scroll down at different speeds, users may change such speed near certain portions of content, users may skip certain portion of content, etc. All such activities may have implications as to users' engagement to content. The present teaching leverages a variety of user activities that may occur across different device types in different settings to achieve better estimation of users' engagement in order to enhance the ability of capturing the representative user's interests in a more reliable manner.

One aspect of recommending quality personalized content is to build a content pool with quality content that covers subject matters interesting to users. Content in the content pool can be rated in terms of the subject and/or the performance of the content itself. For example, content can be characterized in terms of concepts it discloses and such a characterization may be generated with respect to the universal interest space, e.g., defined via concept archive(s) such as content taxonomy and/or Wikipedia and/or online encyclopedia, as discussed above. For example, each piece of content can be characterized via a high dimensional vector with each attribute of the vector corresponding to a concept in the interest universe and the value of the attribute indicates whether and/or to what degree the content covers the concept. When a piece of content is characterized in the same universal interest space as that for user's profile, the affinity between the content and a user profile can be efficiently determined.

Each piece of content in the content pool can also be individually characterized in terms of other criteria. For example, performance related measures, such as popularity of the content, may be used to describe the content. Performance related characterizations of content may be used in both selecting content to be incorporated into the content pool as well as selecting content already in the content pool for recommendation of personalized content for specific users. Such performance oriented characterizations of each piece of content may change over time and can be assessed periodically and can be done based on users' activities. Content pool also changes over time based on various reasons, such as content performance, change in users' interests, etc. Dynamically changed performance characterization of content in the content pool may also be evaluated periodically or dynamically based on performance measures of the content so that the content pool can be adjusted over time, i.e., by removing low performance content pieces, adding new content with good performance, or updating content.

Certain content in the content pool, e.g., journals or news, need to be updated over time. Conventional solutions usually update such content periodically based on a fixed schedule. The present teaching discloses the scheme of dynamically determining the pace of updating content in the content pool based on a variety of factors. Content update may be affected by context information. For example, the frequency at which a piece of content scheduled to be updated may be every 2 hours, but this frequency can be dynamically adjusted according to, e.g., an explosive event such as an earthquake. As another example, content from a social group on Facebook devoted to Catholicism may normally be updated daily. When Pope Benedict's resignation made the news, the content from that social group may be updated every hour so that interested users can keep track of discussions from members of this social group. In addition, whenever there are newly identified content sources, it can be scheduled to update the content pool by, e.g., crawling the content from the new sources, processing the crawled content, evaluating the crawled content, and selecting quality new content to be incorporated into the content pool. Such a dynamically updated content pool aims at growing in compatible with the dynamically changing users' interests in order to facilitate quality personalized content recommendation.

Additional novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

FIG. 1 depicts an exemplary system diagram 10 for recommending content to a user 105, according to an embodiment of the present teaching. System 10 comprises a personalized content recommendation component 100, which comprises numerous sub components, content sources 110, knowledge archives 115, third party platforms 120, and/or any other components. Content sources 110 may be any source of on-line content such as on-line news, published papers, blogs, on-line tabloids, magazines, audio content, image content, and video content. They may include content from content providers such as Yahoo! Finance, Yahoo! Sports, CNN, and ESPN. They may include multimedia content or text or any other form of content comprised of website content, social media content, such as Facebook, twitter, Reddit, etc, or any other content rich provider. It may be licensed content from providers such AP and Reuters. They may include content crawled and indexed from various sources on the Internet. Content sources 110 provide a vast array of content to the personalized content recommendation component 100 of system 10.

Knowledge archives 115 may be an on-line encyclopedia such as Wikipedia or indexing system such as an on-line dictionary. On-line concept archives 115 may be used for its content as well as its categorization or indexing systems. Knowledge archives 115 provide extensive classification system to assist with the classification of both the user's 105 preferences as well as classification of content. Knowledge concept archives, such as Wikipedia may have hundreds of thousands to millions of classifications and sub-classifications. A classification is used to show the hierarchy of the category. Classifications serve two main purposes. First they help the system understand how one category relates to another category and second, they help the system maneuver between higher levels on the hierarchy without having to move up and down the subcategories. The categories or classification structure found in knowledge archives 115 is used for multidimensional content vectors as well as multidimensional user profile vectors which are utilized by personalized content recommendation component 100 to match personalized content to a user 105. Third party platforms 120 maybe any third party applications including but not limited to social networking sites like Facebook, Twitter, LinkedIn, Google+. It may include third party mail servers such as GMail or Bing Search. Third party platforms 120 provide both a source of content as well as insight into a user's personal preferences and behaviors.

Personalized content recommendation component 100 may comprise applications 130, content pool 135, content pool generation/update unit 140, concept/content analyzer 145, content crawler 150, unknown interest explorer 215, user understanding unit 155, user profiles 160, content taxonomy 165, context information analyzer 170, user event analyzer 175, third party interest analyzer 190, social media content source identifier 195 and/or any other components. Personalized content recommendation component 100 may be triggered when user 105 engages with system 10 through applications 130. Applications 130 may receive information in the form of a user id, cookies, log in information from user 105 via some form of computing device. User 105 may access system 10 via a wired or wireless device and may be stationary or mobile. User 105 may interface with the applications 130 on a tablet, a Smartphone, a laptop, a desktop or any other computing device which may be embedded in devices such as watches, eyeglasses, or vehicles. In addition to receiving insights from the user 105 about what information the user 105 might be interested, applications 130 provides information to user 105 in the form of personalized content stream. User insights might be user search terms entered to the system, declared interests, user clicks on a particular article or subject, user dwell time or scroll over of particular content, user skips with respect to some content, etc. User insights may be a user indication of a like, a share, or a forward action on a social networking site, such as Facebook, or even peripheral activities such as print or scan of certain content. All of these user insights or events are utilized by the personalized content recommendation component 100 to locate and customize content to be presented to user 105. User insights received via applications 130 are used to update personalized profiles for users which may be stored in user profiles 160. User profiles 160 may be database or a series of databases used to store personalized user information on all the users of system 10. User profiles 160 may be a flat or relational database and may be stored in one or more locations. Such user insights may also be used to determine how to dynamically update the content in the content pool 135.

A specific user event received via applications 130 is passed along to user event analyzer 175, which analyzes the user event information and feeds the analysis result with event data to the user understanding unit 155 and/or the content pool generation/update unit 140. Based on such user event information, the user understanding unit 155 estimates short term interests of the user and/or infer user's long term interests based on behaviors exhibited by user 105 over long or repetitive periods. For example, a long term interest may be a general interest in sports, where as a short term interest may be related to a unique sports event, such as the Super Bowl at a particular time. Over time, a user's long term interest may be estimated by analyzing repeated user events. A user who, during every engagement with system 10, regularly selects content related to the stock market may be considered as having a long term interest in finances. In this case, system 10 accordingly, may determine that personalized content for user 105 should contain content related to finance. Contrastingly, short term interest may be determined based on user events which may occur frequently over a short period, but which is not something the user 105 is interested in the long term. For example, a short term interest may reflect the momentary interest of a user which may be triggered by something the user saw in the content but such an interest may not persist over time. Both short and long term interest are important in terms of identifying content that meets the desire of the user 105, but need to be managed separately because of the difference in their nature as well as how they influence the user.

In some embodiments, short term interests of a user may be analyzed to predict the user's long term interests. To retain a user, it is important to understand the user's persistent or long term interests. By identifying user 105's short term interest and providing him/her with a quality personalized experience, system 10 may convert an occasional user into a long term user. Additionally, short term interest may trend into long term interest and vice versa. The user understanding unit 155 provides the capability of estimating both short and long term interests.

The user understanding unit 155 may be configured to gather user information from multiple sources, including all the user's events, and creates one or more multidimensional personalization vectors. In some embodiments, the user understanding unit 155 receives inferred characteristics about the user 105 based on the user events, such as the content he/she views, self declared interests, attributes or characteristics, user activities, and/or events from third party platforms. In an embodiment, the user understanding unit 155 receives inputs from social media content source identifier 195. Social media content source identifier 195 relies on user 105's social media content to personalize the user's profile. By analyzing the user's social media pages, likes, shares, etc, social media content source identifier 195 provides information for user understanding unit 155. The social media content source identifier 195 is capable of recognizing new content sources by identifying, e.g., quality curators on social media platforms such as Twitter, Facebook, or blogs, and enables the personalized content recommendation component 100 to discover new content sources from where quality content can be added to the content pool 135. The information generated by social media content source identifier 195 may be sent to a content/concept analyzer 145 and then mapped to specific category or classification based on content taxonomy 165 as well as a knowledge archives 115 classification system.

As will be disclosed in great details below, the user understanding unit 155 may be configured to create a base user profile for association with users whose interests have not been identified. As described above, such situations may arise when a presence of a given user is detected but a user profile of the given user cannot be obtained. For instance, the given user may not have logged in via an application or applications 130. In the present teaching, in those situations, the user understanding unit 155 may be triggered to associate the base user profile with the given user.

The third party interest analyzer 190 may be configured to leverage information from other third party platforms about users active on such third party platforms, their interests, as well as content these third party users to enhance the performance of the user understanding unit 155. For example, when information about a large user population can be accessed from one or more third party platforms, the user understanding unit 155 can rely on data about a large population to establish a baseline interest profile to make the estimation of the interests of individual users more precise and reliable, e.g., by comparing interest data with respect to a particular user with the baseline interest profile which will capture the user's interests with a high level of certainty.

When new content is identified from content source 110 or third party platforms 120, it is processed and its concepts are analyzed. The concepts can be mapped to one or more categories in the content taxonomy 165 and the knowledge archives 115. The content taxonomy 165 is an organized structure of concepts or categories of concepts and it may contain a few hundred classifications of a few thousand. The knowledge archives 115 may provide millions of concepts, which may or may not be structures in a similar manner as the content taxonomy 165. Such content taxonomy and knowledge archives may serve as a universal interest space. Concepts estimated from the content can be mapped to a universal interest space and a high dimensional vector can be constructed for each piece of content and used to characterize the content. Similarly, for each user, a personal interest profile may also be constructed, mapping the user's interests, characterized as concepts, to the universal interest space so that a high dimensional vector can be constructed with the user's interests levels populated in the vector.

Content pool 135 may be a general content pool with content to be used to serve all users. The content pool 135 may also be structured so that it may have personalized content pool for each user. In this case, content in the content pool is generated and retained with respect to each individual user. The content pool may also be organized as a tiered system with both the general content pool and personalized individual content pools for different users. For example, in each content pool for a user, the content itself may not be physically present but is operational via links, pointers, or indices which provide references to where the actual content is stored in the general content pool.

Content pool 135 is dynamically updated by content pool generation/update component 140. Content in the content pool comes and go and decisions are made based on the dynamic information of the users, the content itself, as well as other types of information. For example, when the performance of content deteriorates, e.g., low level of interests exhibited from users, the content pool generation/update unit 140 may decide to purge it from the content pool. When content becomes stale or outdated, it may also be removed from the content pool. When there is a newly detected interest from a user, the content pool generation/update unit 140 may fetch new content aligning with the newly discovered interests. User events may be an important source of making observations as to content performance and user interest dynamics. User activities are analyzed by the user event analyzer 175 and such Information is sent to the content pool generation/update unit 140. When fetching new content, the content pool generation/update unit 140 invokes the content crawler 150 to gather new content, which is then analyzed by the content/concept analyzer 145, then evaluated by the content pool generation/update unit 140 as to its quality and performance before it is decided whether it will be included in the content pool or not. Content may be removed from content pool 135 because it is no longer relevant, because other users are not considering it to be of high quality or because it is no longer timely. As content is constantly changing and updating content pool 135 is constantly changing and updating providing user 105 with a potential source for high quality, timely personalized content.

Content ranking unit 210 may be configured to generate the content stream to be recommended to user 105 based on content, selected from content pool 135 based on the user's profile. The content to be recommended to the user 105 may also be determined, by the content ranking unit 210, based on information from the context information analyzer 170. For example, if a user is currently located in a beach town which differs from the zip code in the user's profile, it can be inferred that the user may be on vacation. In this case, information related to the locale where the user is currently in may be forwarded from the context information analyzer to the Content ranking unit 210 so that it can select content that not only fit the user's interests but also is customized to the locale. Other context information may include day, time, and device type. The context information can also include an event detected on the device that the user is currently using such as a browsing event of a website devoted to fishing. Based on such a detected event, the momentary interest of the user may be estimated by the context information analyzer 170, which may then direct the Content ranking unit 210 to gather content related to fishing amenities in the locale the user is in for recommendation. Further details about content ranking unit 210 will be described in FIG. 17.

The personalized content recommendation component 100 can also be configured to allow probing content to be included in the content to be recommended to the user 105, even though the probing content does not represent subject matter that matches the current known interests of the user. Such probing content is selected by the unknown interest explorer 215. Once the probing content is incorporated in the content to be recommended to the user, information related to user activities directed to the probing content (including no action) is collected and analyzed by the user event analyzer 175, which subsequently forwards the analysis result to long/short term interest identifiers 180 and 185. If an analysis of user activities directed to the probing content reveals that the user is or is not interested in the probing content, the user understanding unit 155 may then update the user profile associated with the probed user accordingly. This is how unknown interests may be discovered. In some embodiments, the probing content is generated based on the current focus of user interest (e.g., short term) by extrapolating the current focus of interests. In some embodiments, the probing content can be identified via a random selection from the general content, either from the content pool 135 or from the content sources 110, so that an additional probing can be performed to discover unknown interests.

To identify personalized content for recommendation to a user, the content ranking unit 210 takes all these inputs and identify content based on a comparison between the user profile vector and the content vector in a multiphase ranking approach. The selection may also be filtered using context information. Advertisement to be inserted as well as possibly probing content can then be merged with the selected personalized content.

Figure 2:
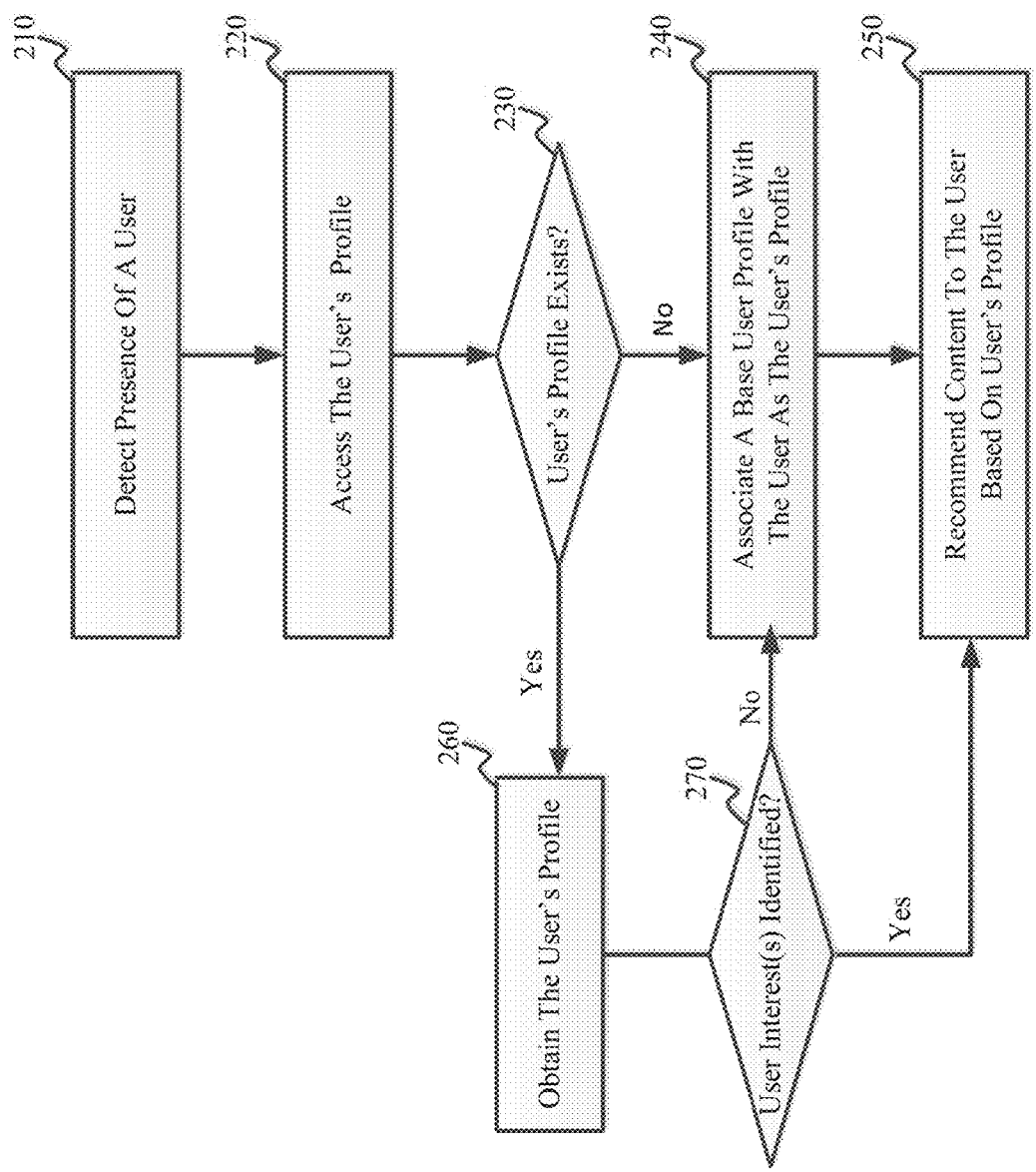
FIG. 2 is a flowchart of an exemplary process for recommending content to a user, according to an embodiment of the present teaching.

FIG. 2 is a flowchart of an exemplary process for recommending content to a user, according to an embodiment of the present teaching. It will be referenced with FIG. 1. As shown in this example, at an operation 210, a presence of a user may be detected. The detection of the user's presence at operation 210 may include detecting user activities during a current time period or a past time period. For example, the user's presence may be detected when the user is currently active in viewing content sources 110, interacting with knowledge archives 115, engaging in social media activities facilitated by $3^{rd}$ party platforms 120.

At an operation 220, a user profile may be accessed for the user. As used herein, a user profile may include information about the user. The user information may comprise one or more user parameters related to the given user. The one or more user parameters may include, but not limited to, a language spoken by, a geolocation of, an age group of, a time zone of, an experience level of, an activity level of the given user, and/or any other user parameters associated with the given user. The activity level of the given user may include previous login time(s), previous logout time(s), login frequency, time spent logged in, and/or other activity information.

The user information may include information related to purchases or spending by the user. Such spending information may include, for example, purchase information for individual transactions, a spend rate, a total spend amount, and/or other information related to user purchases. The spending information may indicate a level of spending by the user, for example, without limitation, lifetime spending (total spending by the given user), average spending during certain predetermined periods (e.g., spending by the given user during thanksgiving, Christmas and/or any other periods), spending by the given user during certain events, and any other spending information by the user.

Other information included in the user profile may include, for example, information identifying users (e.g., a username or handle, a number, an identifier, and/or other identifying information) within the virtual space, security login information (e.g., a login code or password), account information, subscription information, virtual currency account information (e.g., related to currency held in credit for a user), relationship information (e.g., information related to relationships between users), usage information, demographic information associated with users, interaction history among users in the virtual space, information stated by users, purchase information of users, browsing history of users, a client computing platform identification associated with a user, a phone number associated with a user, and/or other information related to users. Other examples of user information are contemplated.

At an operation 230, a determination whether a user profile for the user exists may be made. As described above, in situations where the user has not logged into the system to identify him/herself (e.g., via a username), the user profile for the user may not be accessed. As another example, in some situations, the user profile may not be accessible simply because it cannot be retrieved. For instance, without limitation, a network error may occur and the user's profile may not be accessed during a time period. In that instance, on TIME_OUT, at operation 230, it may be determined that the user's profile does not exist. In any case, as shown in FIG. 2, in the case when it is determined that the user's profile cannot be accessed the process proceeds to operation 240; and in the case when it is determined that the user's profile can be accessed, the process proceeds to operation 260 to obtain the user's profile.

At an operation 270, a determination whether interest(s) of the user has been identified may be made. In some situations, for example when there is not enough information associated with the user to identify the interest(s) of the user (e.g., the user account associated with the user is new), interest(s) of the user may not be identified. In those situations, the process may proceed to operation 240.

At an operation 240, a base user profile may be associated with the user as the user's profile since the user's profile cannot be accessed as determined in operation 230. At an operation 250, content may be recommended to the user based on the user's profile.

Figure 3:
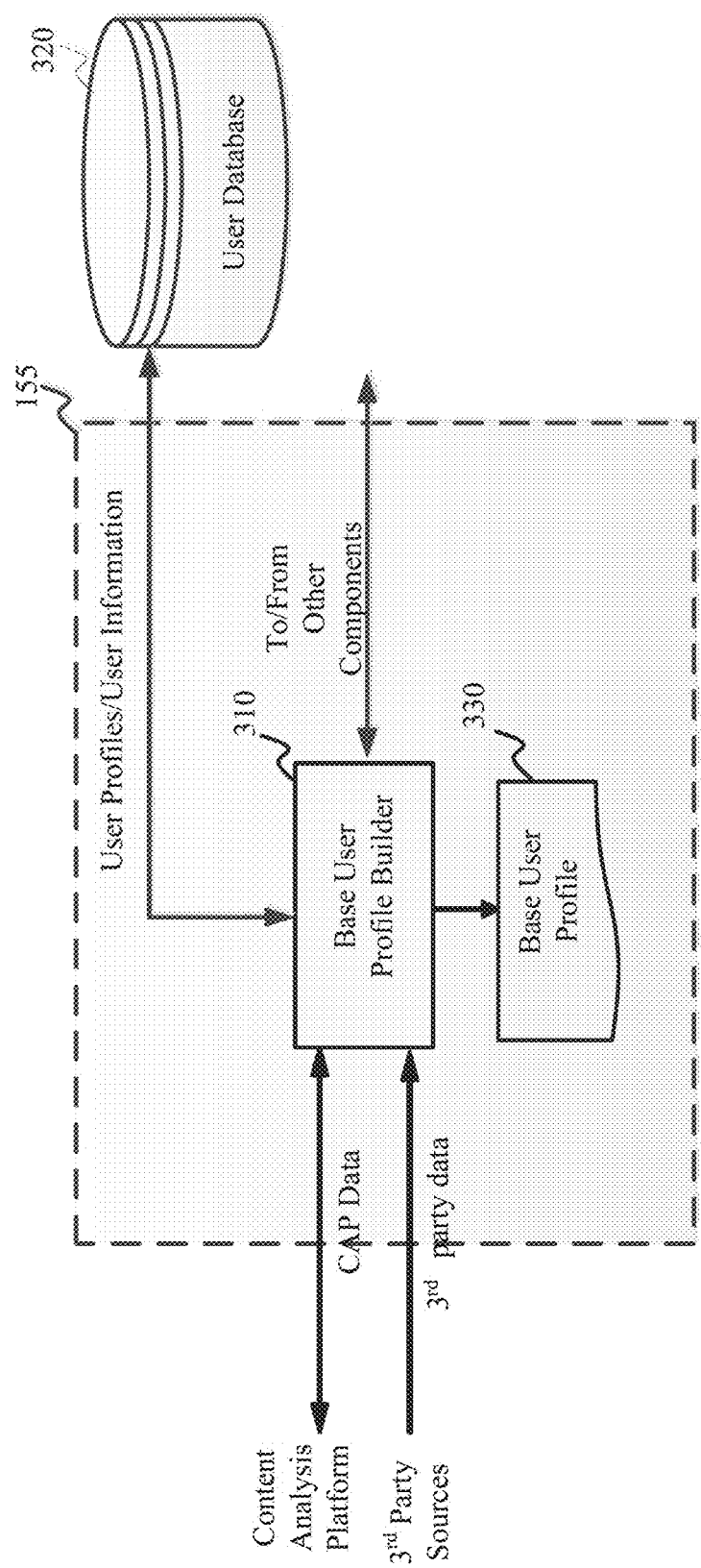
FIG. 3 depicts an exemplary diagram of a user understanding unit, according to an embodiment of the present teaching.

FIG. 3 depicts an exemplary system diagram of a user understanding unit 155 shown in FIG. 1, according to an embodiment of the present teaching. It will be described with reference to FIG. 1. As shown, the user understanding unit 155 may include a base user profile builder 310 and other components (if any). As shown, the user understanding unit 155 may be configured to create a base user profile 330. In this example, as shown, the user understanding unit 155 may interface with content analysis platform (CAP), $3^{rd}$ party sources and/or any other components for generating the base user profile 330. Further details about the interfacing and interaction between the base builder 155 and the CAP and the $3^{rd}$ party sources will be described below. As still shown, the base user profile builder 310 may be configured to access a user database 320 to obtain user profiles and/or user information.

Figure 4:
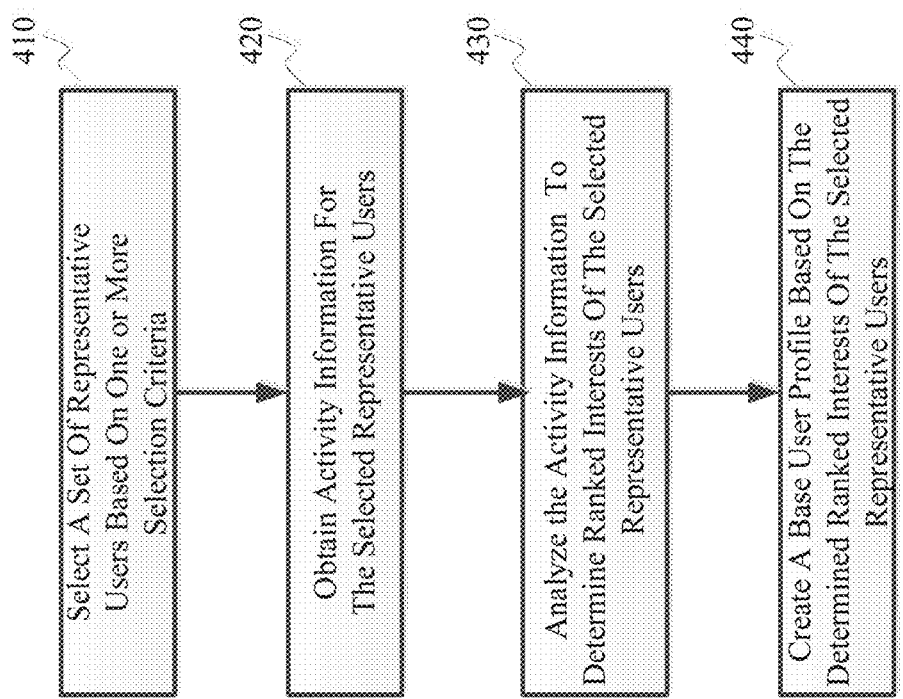
FIG. 4 is a flowchart of an exemplary process of creating a base user profile, according to an embodiment of the present teaching.
Figure 11:
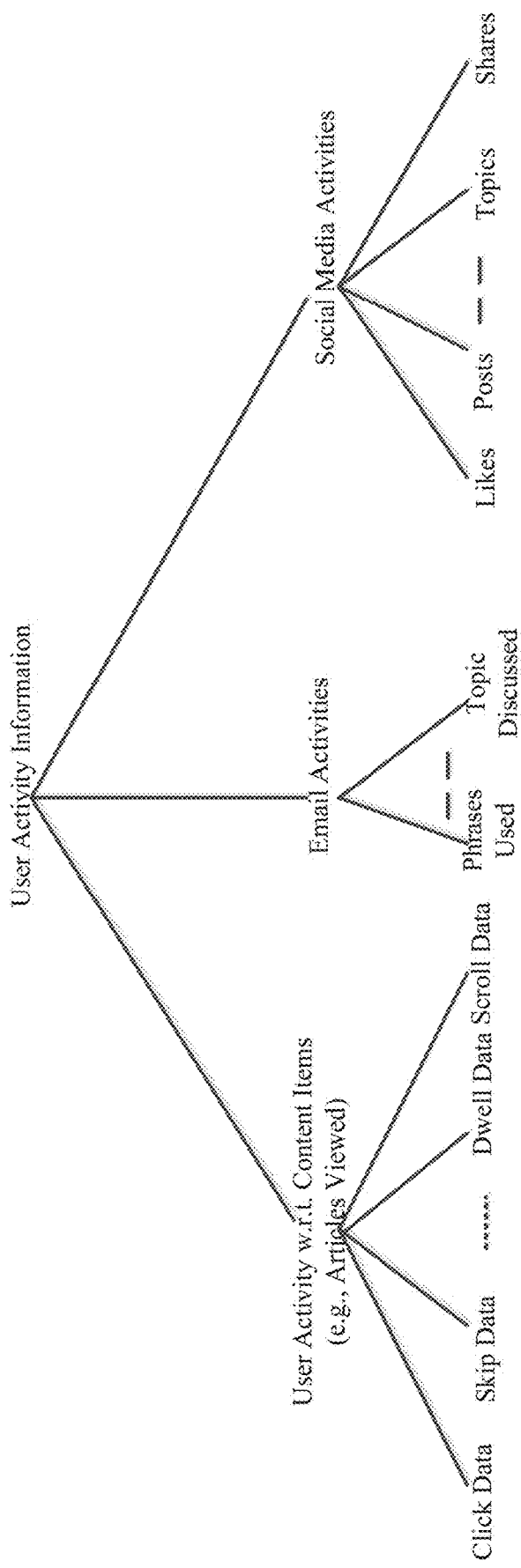
FIG. 11 illustrates exemplary types of user activity information.

FIG. 4 is a flowchart of an exemplary process of creating a base user profile 330 shown in FIG. 3, according to an embodiment of the present teaching. As shown, at an operation 410, a set of representative users may be selected for creating the base user profile 330. As will be described in further details, the representative users selected by operation 410 may have certain characteristics so that the interest(s) of those users may be determined to be used for recommending content to a user whose user profile or interest(s) cannot be identified. At an operation 420, activity information may be obtained for the representative users selected by operation 410. FIG. 11 illustrates some examples of activity information that may be obtained in operation 420. At an operation 430, the activity information obtained in operation 420 may be analyzed to determine ranked interests of the selected representative users. At an operation 440, the base user profile may be created based on the ranked interests determined in operation 430.

Figure 5:
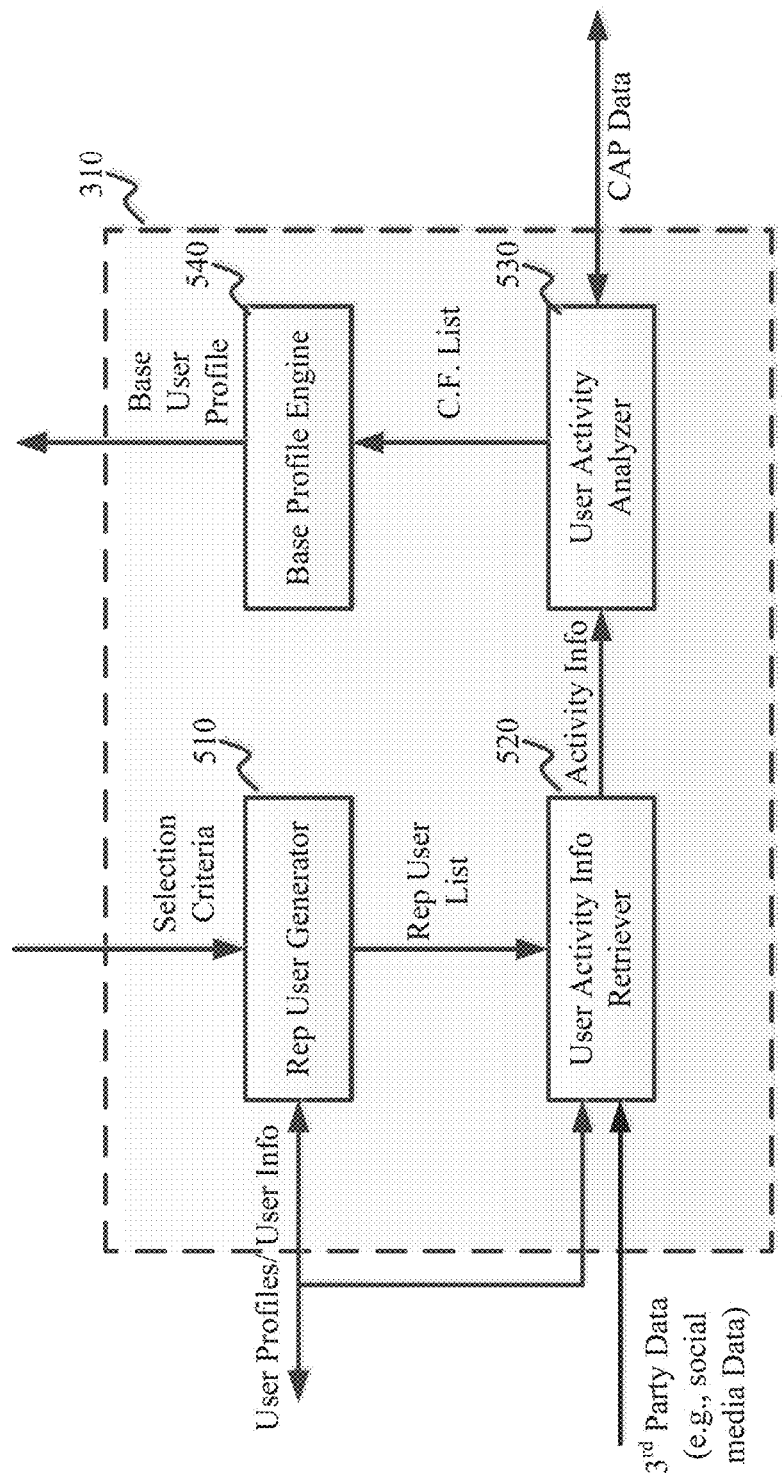
FIG. 5 depicts an exemplary diagram of a base profile builder, according to an embodiment of the present teaching.

FIG. 5 depicts an exemplary system diagram of a base profile builder 310 shown in FIG. 3, according to an embodiment of the present teaching. As shown in this example, the base profile builder 310 may include a representative user generator 510, a user activity information retriever 520, a user activity analyzer 530, a base profile engine 540, and/or any other components. As shown, the representative user generator 310 may be configured to receive selection criteria, user profiles, user information, and/or any other information to generate a list of representative users. Further details about representative user generator 510 will be described in FIG. 8. The user activity information retriever 520 may be configured to retrieve user activity information for the list of representative users generated by the representative user generator 510. The user activity information retrieved by the user activity information 520 may include user profiles, user information, $3^{rd}$ party data, and/or any other type(s) of user activity information. The user activity analyzer 530 may be configured to receive user activity information retrieved by the user activity information retriever 520, process the received activity information using the content analysis platform and create a list of ranked interests. Further details about the user activity analyzer 530 will be described in FIG. 11. The base profile engine 540 may be configured to receive and process the ranked interest list created by the user activity analyzer 530, and to create a base user profile based on the processing of the ranked interest list. Further details about the base profile engine 540 will be described in FIG. 12.

Figure 6:
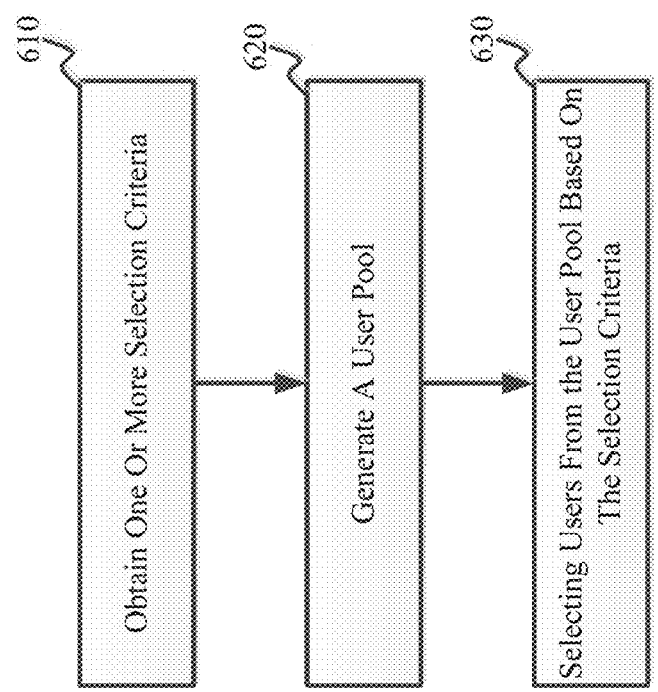
FIG. 6 is a flowchart of an exemplary process for obtaining a set of representative users, according to an embodiment of the present teaching.

FIG. 6 is a flowchart of an exemplary process for obtaining a set of representative users, according to an embodiment of the present teaching. As shown in this example, at an operation 610, one or more selection criteria for selecting the representative users may be obtained. In some examples, the selection criteria may be predetermined by provider, administrator, moderator, and/or any other entities related to the system 10 and stored in a data store included in or accessible to system 10. In some examples, the selection criteria may be dynamically determined by provider, administrator, moderator, and/or any other entities related to the system 10 via a graphical user interface during runtime of system 10.

Figure 7:
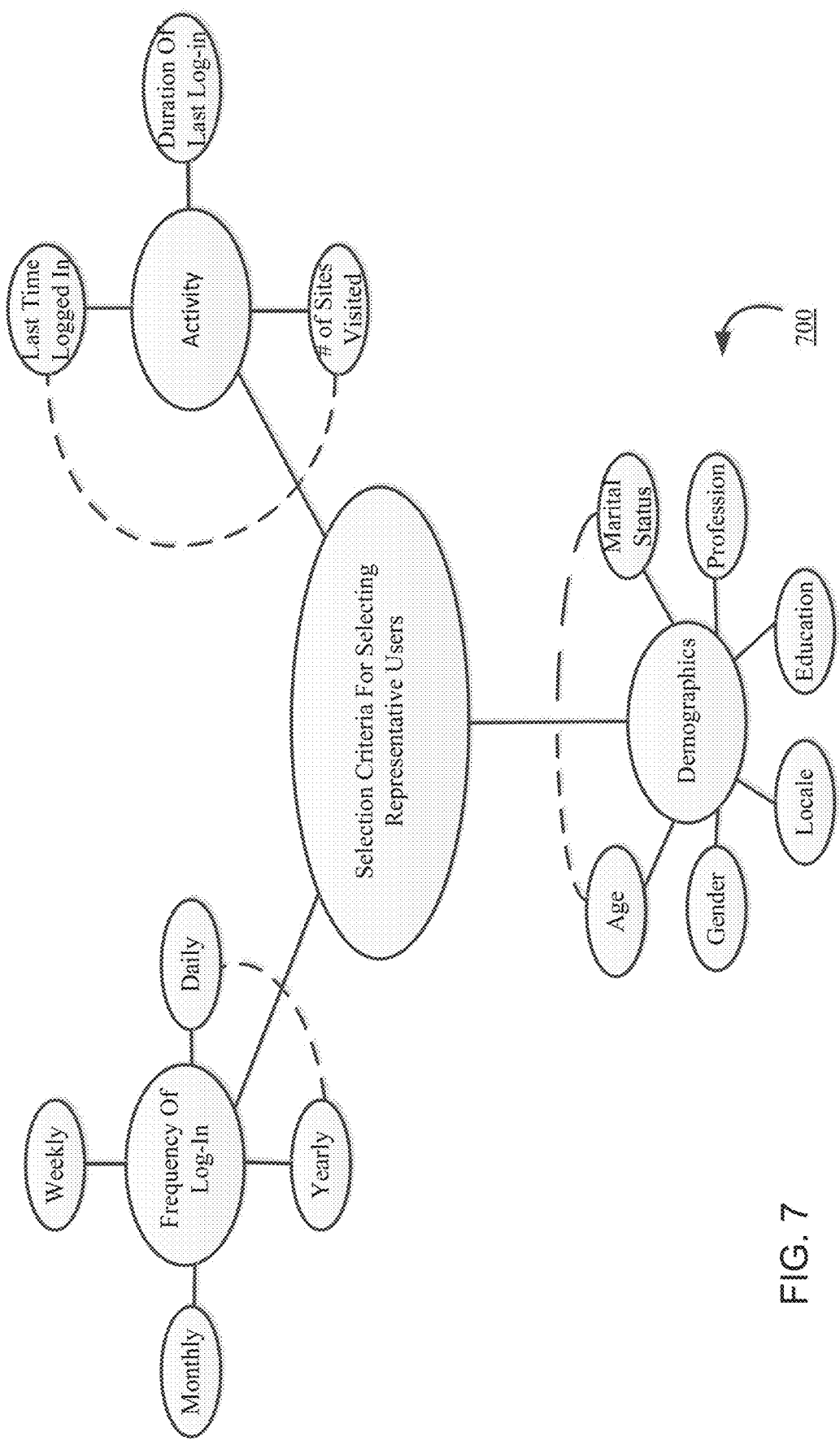
FIG. 7 illustrates examples of selection criteria for selecting the set of representative users.

FIG. 7 illustrates some examples of selection criteria for selecting the set of representative users. As shown in FIG. 7, the selection criteria 700 may include demographics criteria, frequency of log-in criteria, level of activity criteria, and/or any other criteria for selecting the representative users. The demographics criteria may be used to select a set of representative users that meet the demographics criteria, which, as shown, may include age, gender, locale, education level, profession, marital status, and/or any other demographics criteria. As an example, thus not limiting, the demographics criteria may be used to specify a set of representative users between ages 18-35, male, and resides in UK. The frequency of log-in criteria may be used to select a set of representative users that meet threshold(s) of log-in frequency into system 10 or any other systems related to system 10. For example, without limitation, the frequency of log-in criteria may specify a set of users who log into system 10 at least 3 times a week, and at least 13 times a month within the past 3 months. The activity criteria may be used to select a set of users that have more than a threshold or thresholds of activity level as specified by the activity criteria. For example, without limitation, the activity criteria may be used to select a set of representative users who have at least one 30 minutes log-in session with system 10 in the past week, and have visited at least 3 different web sites during that log-in session. Other examples of selection criteria are contemplated. It should be understood the selection criteria, such as those illustrated in FIG. 7, may be used alone or in combination to select the list of representative users as however desired.

Returning to FIG. 6, at an operation 620, a user pool may be generated. In one implementation, at operation 620, a list of all users active (e.g., log into system 10 at least once) within a predetermined time period (e.g., the past month) may be obtained. At an operation 630, representative users may be selected from the user pool generated in operation 620 based on the selection criteria obtained in operation 610.

Figure 8:
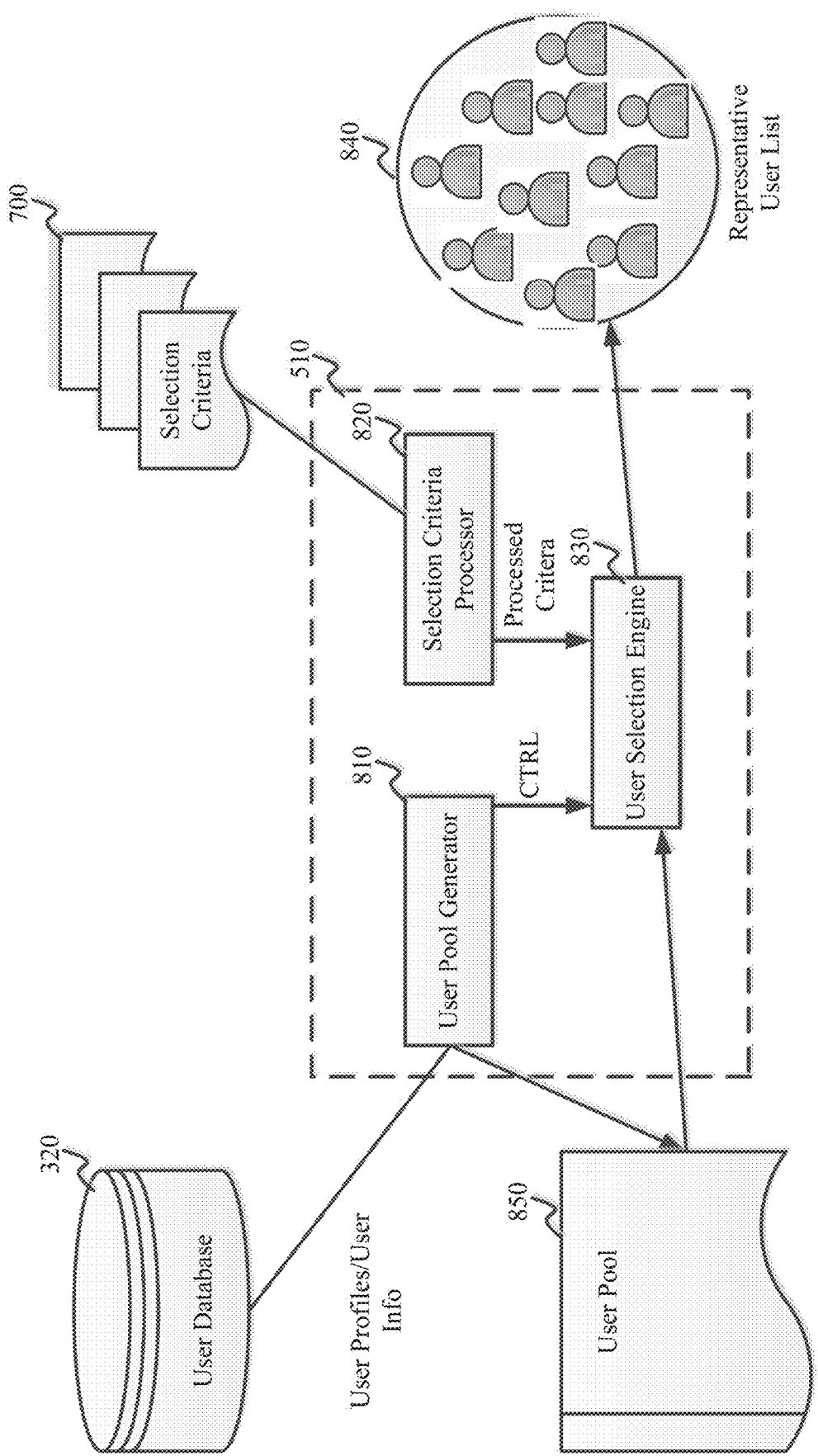
FIG. 8 depicts an exemplary diagram of a representative user generator, according to an embodiment of the present teaching.

FIG. 8 depicts an exemplary diagram of a representative user generator shown in FIG. 5, according to an embodiment of the present teaching. It will be described with reference to FIGS. 3, 5, 6 and 7. As shown in this example, the representative user generator 510 may include a user pool generator 810, a selection criteria processor 820, a user selection engine 830, and/or any other components. The user pool generator 810 may be configured to communicate with user database 320 for obtaining user profiles and/or user information, and generate a user pool 850 based on the obtained user profiles and/or user information. The functionality of user pool generator 810 may be the same as or substantially similar to those achieved by operation 620. The selection criteria processor 820 may be configured to obtain and processing one or more selection criteria 700 for selecting a set of representative users from the user pool 850. Processing the obtained selection criteria may involve combining the obtained selection criteria, removing overlapping criteria values, prioritizing the obtained selection criteria and/or any other operations. The user selection engine 830 may be configured to select a set of representative users 840 from the user pool 850 based on the selection criteria obtained and processed by the selection criteria processor 820. As an example, the set of representative users selected by the selection engine 830 may include users who have logged into the system 10 at 10 times in the past week, spending at least 15 minutes viewing contents provided by the content sources 110, and residing in the UK. Other examples of representative users selected by the user selection engine 830 are contemplated.

Figure 9:
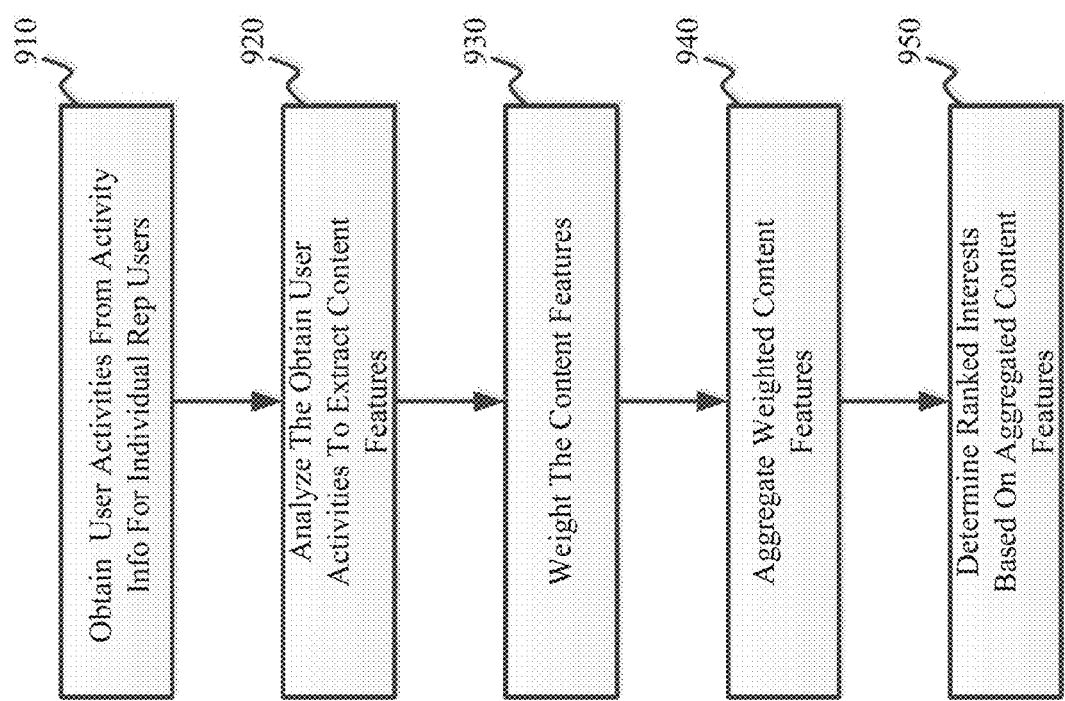
FIG. 9 is a flowchart of an exemplary process of analyzing user activity information associated with the representative users, according to an embodiment of the present teaching.

FIG. 9 is a flowchart of an exemplary process of analyzing user activity information associated with the representative users, according to an embodiment of the present teaching. As shown, in this example, at an operation 910, user activities for the selected individual representative users may be obtained. As will be described below in further details, sources of activity information may include content system, third party systems (e.g., social media), electronic mail system, and/or any other sources. At an operation 920, the user activities obtained in operation 910 may be analyzed. In implementations, the analysis by operation 920 may be performed by the content analysis platform (CAP). An exemplary CAP may score a plurality of content features from the user activity information. The CAP data (e.g., CAP features) may be used in an operation 930 to weight user activities for the individual representative users. The weighting factors for operation 930 may include content relevance score, dwell time by the user for viewing the contents containing the extracted content features, user metrics (e.g., user score based on activity level), and/or any other weighting factors. Further details about the weighting performed in operation 930 will be described in FIGS. 14-16. At an operation 940, the weighted content features may be aggregated, and at an operation 950 ranked interests of the representative users may be determined based on the aggregated weighted content features. For example, without limitation, a predetermined number of content features may be determined as the ranked interests of the selected representative users.

Figure 10:
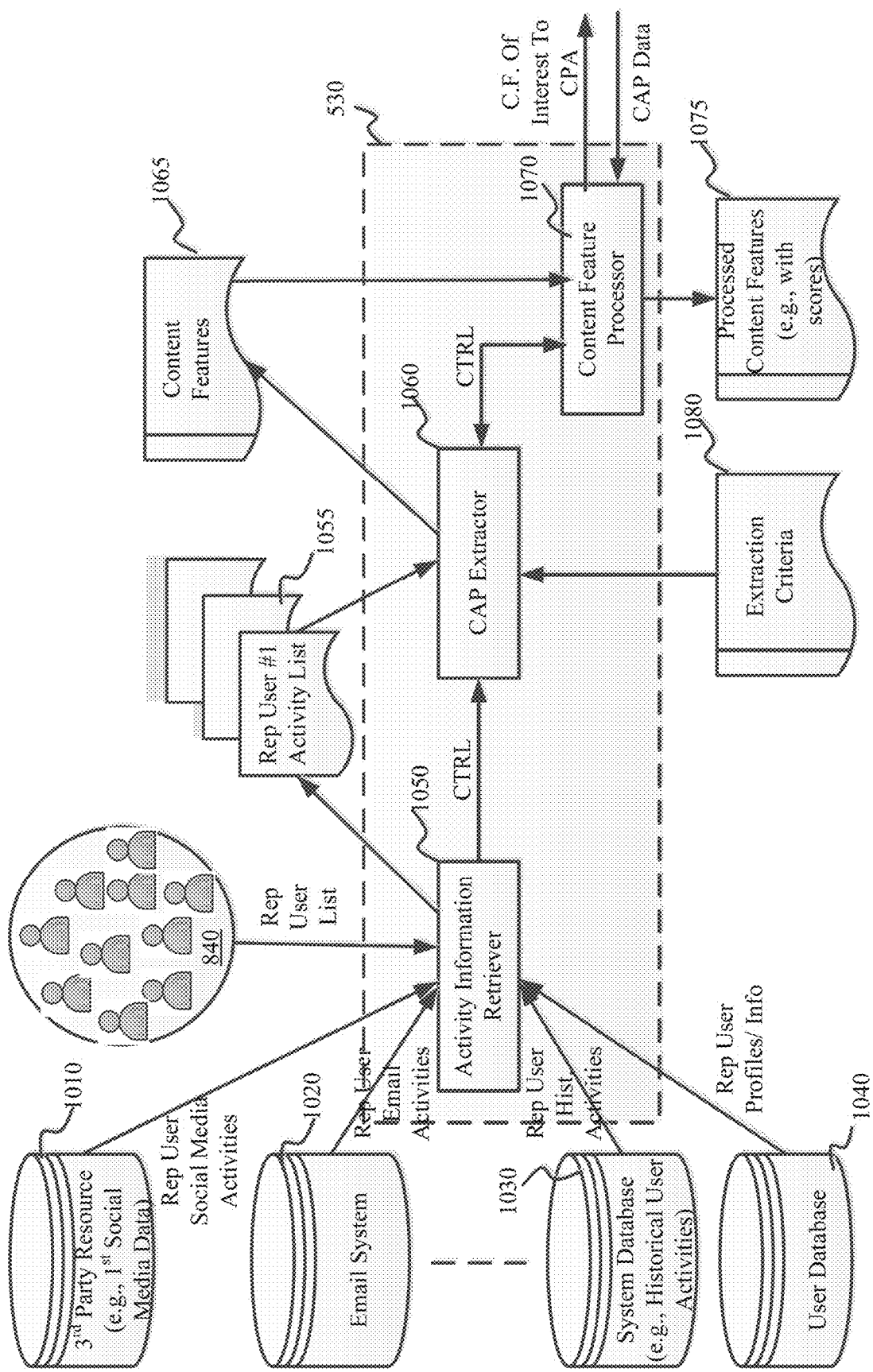
FIG. 10 depicts an exemplary diagram of a user activity information analyzer, according to an embodiment of the present teaching.

FIG. 10 depicts an exemplary diagram of a user activity information analyzer shown 530 in FIG. 5, according to an embodiment of the present teaching. It will be described with reference to FIG. 8. As shown, the user activity information analyzer 530 shown in FIG. 5 may include an activity information retriever 1050, a CAP extractor 1060, a content feature (C.F.) processor, and/or any other components. As shown in this example, the activity information retriever 1050 may be configured to receive the list of representative users, such as the list of representative users 840 illustrated in FIG. 8 and described herein. As shown, the activity information retriever may be configured to obtain user profiles and/or other user information from the user database 1040 for the representative users. The user profiles and/or the other user information may be obtained to retrieve user identification information, such as social media, email system, $3^{rd}$ party service and/or any other identification information that has been associated with the individual representative users in the list 840. In some examples, the user profiles and/or the user information obtained from the user database 1040 may contain user activity information needed to create a base user profile in accordance with the present teachings. In some examples, as illustrated in FIG. 1, the activity information retriever 1050 may be configured to retrieve the activity information from sources such as $3^{rd}$ party social media, email system, system database and/or any other sources.

FIG. 11 illustrates exemplary types of user activity information that may be obtained for the individual representative users to determine ranked interests among the representative users. As shown, obtained representative user activity information may include information indicating user activity with respect to a content item. Such information may indicate user click data, user skip data derived from user click data or received via direct signaling, as well as user dwell data indicative of user inactivity with respect to a content item or part thereof, and scroll data indicative of scroll direction, scroll rate, and scroll extent, among other user activity information. As also shown, the obtained representative user active information may include information indicating email activities of the representative users. Such information may indicate, for example, phrases used by the representative users in the emails created by the representative users, topics discussed by the representative users in the emails, hyperlinks included or clicked by the representative users in the email, and/or any other email activity information. As still shown, the obtained representative user information may include information indicating social media activities performed by the representative users. Such information may indicate likes, post contents, topics discussed, links shared, and/or any other types of social media activities performed by the representative users via one or more social media sites. Other examples of user activity information that may be obtained for the individual representative users to determine ranked interests of the representative users are contemplated. The obtained activity information by the activity information retriever 1050 may be over a time period determined by a provider, administrator, moderator, and/or any other entities related to system 10. For example, without limitation, the activity information obtained Returning to FIG. 10, the CAP extractor 1060 may be configured to extract content features (C.F.) from the activity information retrieved by the activity information retriever 1050. Extracting content features by the CAP extractor 106 may include examining activities of the representative users obtained by the activity information retriever 1050, obtaining activity extraction criteria, detecting activity of interests among all activities obtained, generating content features 1065 and/or any other operations. As shown in this example, the CAP extractor 1060 may be configured to obtain extraction criteria 1080, which may include criteria such as a list of topics or phrase of interest, identification of specific content item of interest (e.g., a specific article), minimum amount of time dwell on a content item, maximum amount scrolling performed on an content item, and/or any other criteria. As an illustration, without limitation, the extraction criteria may include criteria value indicating content features that a given representative user has dwell on for a minimum 10 minutes (a good indicator that the user was viewing the content features) should be extracted. The form of the content features, such as the content features 1065 shown may vary. In one example, the content features that may be extracted may simply include the entire content item (e.g., an article) that meets the extract criteria. In another example, the content features that may be extracted may include the title, abstract, first few paragraphs, a section in content (e.g., article) where the given representative user spends most dwell time on compared with other sections in the content, key phrases, terms identified by the editor, creator, author of the content, and/or any other content features. Other examples of content features are contemplated.

The content feature processor 1070 may be configured to process the extracted content features and create processed content features. In an embodiment, processing the content features may include extracting relevant phrases or terms associated with the content features, assigning scores to the extracted relevant phrases or terms, and/or any other operations. In implementations, as illustrated, the content feature processor 1070 may be configured to employ a content analysis platform (CAP) for processing the content features. In those implementations, the CAP may perform content analysis on the content features transmitted by the content feature processor 1070, extracting key phrases, interests, or terms from the content features, assign scores to the extracted phrases, interests, or terms, and transmit the assigned scores in association with the content items (e.g., via CAP data as illustrated) back to the content feature processor 1070 for further processing. Table 1 below illustrates one example of analyzed content features by CAP.

TABLE 1

| CAP analyzed content features | | |
|---|---|---|
| Content Item #1 (e.g., article #1) | List of Phrases Associated with Content Item #1: A, B, C, D . . . | Scores of the Phrases (e.g., relevancy): A: 80% (every relevant), B: 60% (relevant), C: 20% (not very relevant), D: 100% (on point) . . . |
| . . . | . . . | . . . |

As an example, without limitation, the content feature extracted may be an article on Ebola outbreak in Libya because a representative user spent 20 minutes dwelling on that article (in this example, the extraction criteria is 10 minute or more dwell time on an article). In this example, content feature processor 1070 may transmit this article to CAP for further analysis. The CAP may return data indicating a list of 4 key phrases are identified as being associated with this article: e.g., "Ebola", "West Africa", "US health system" and "Epidemic". For these 4 key phrases, the CAP may assign a score as follows: e.g., Ebola=100% indicating that the article is on point with the topic of Ebola, West Africa=40% indicating that the article is somewhat relevant to the topic of West Africa, US health system=60% indicating that the article is relevant to the topic of US health system, and Epidemic=40% indicating the article is very relevant to the topic of Epidemic.

As shown in this example, the content feature processor 1070 may be configured to process the CAP data described above to generate processed content features for individual representative users. As an example, without limitation, the processed content features may be in the form of representative user id, key phrases and associated score tablets. Table 2 below illustrates one example of processed content features generated by content feature processor 1070.

TABLE 2

| Representative User-Phrase - Score Tablets | | |
|---|---|---|
| Rep User #1: UID000X | Phrase #1 e.g.,. xxx | 50% |
| | Phrase #2 e.g., aaa | 80% |
| | Phrase #5 e.g., kkk | 100% |
| | . . . | . . . |
| Rep User #2: UID00XX | Phrase #2 e.g., aaa | 40% |
| | Phrase # 5 e.g., kkk | 50% |
| | Phrase # 17 e.g., ddd | 90% |
| . . . | . . . | . . . |
| Rep User #Y: UID000Y | Phrase # 5, e.g., kkk | 60% |
| | Phrase # 17 e.g., ddd | 40% |

Figure 12:
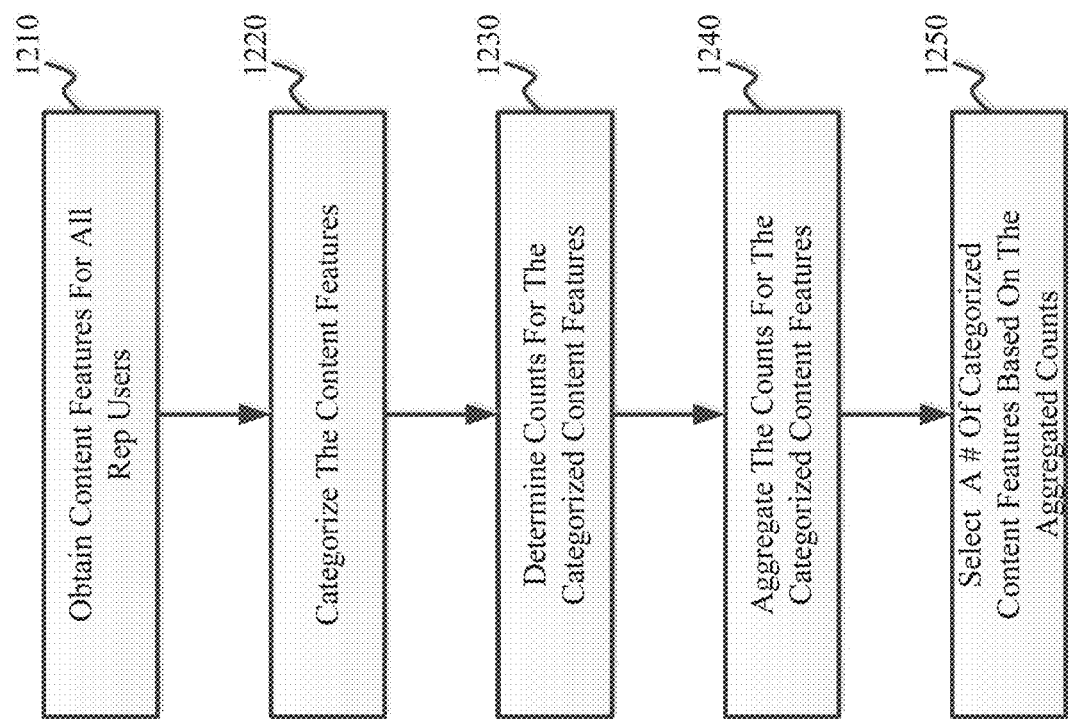
FIG. 12 is a flowchart of an exemplary process for determining ranked interests among the set of representative users, according to an embodiment of the present teaching.

FIG. 12 is a flowchart of an exemplary process for determining ranked interests among the set of representative users, according to an embodiment of the present teaching. As shown, at an operation 1210, content features, such as the processed content features 1075 shown in FIG. 10, may be obtained for all representative users. At an operation 1220, the content features obtained in operation 1210 may be categorized. For example, without limitation, the content features may be categorized by topics, by fields they belong to, by areas they concern, and/or by any other categorization system however desired. In the simplest form, it is contemplated that the content features may be categorized by the meaning within them. For example, without limitation, similar phrases may be categorized in one category: "US Health System", "USA Hospital System", "US Health Networks" and etc. may be categorized under the "US health system". As another example, phrases such as Libya, Kenya, Nigeria and etc. may be categorized under "Africa". Other examples, of categorization of content features are contemplated. At an operation 1230, counts of the categorized content features may be determined. In the simplest form, operation 1230 may involve counting the occurrences (i.e. equal weights) of the content features. In other examples, operation 1230 may involve weighting the categorized content features by various factors. Further details of such weighting will be described in FIGS. 14-16. At an operation 1240, the counts of the content features may be aggregated. As an illustration, the following table 3 illustrates an example of list of categorized content features based on table 2.

TABLE 3

| Categorized Content Features by Representative Users | |
|---|---|
| Phrase #1: e.g., xxx | UID000X: 50% . . . |
| Phrase #2: e.g., aaa | UID000X: 20%, |
| | UID00XX: 40%, . . . |
| Phrase #5: e.g., kkk | UID00XX: 50%; |
| | UID000Y: 60% . . . |
| . . . | . . . |
| Phrase #17: e.g., ddd | UID00XX: 90%; |
| | UID000Y: 40% . . . |

In one implementation where a simple counting method is implemented in operation 1240, the occurrences of the categorized phrases (content features) listed in table 3 above may be counted such that phrase #1 occurred once, phrases #2, #5 and #17 each occurred twice. As will be described in FIGS. 14-16, various weighting may be performed in other examples to aggregate the phrases listed in table 3 above.

Returning to FIG. 12, at an operation 1250, a number of categorized content features may be selected based on the aggregated counts for creating a base use profile. For example, without limitation, the top N number (N>0) of content features by the aggregated counts may be selected as ranked interests for creating the base user profile.

Figure 13:
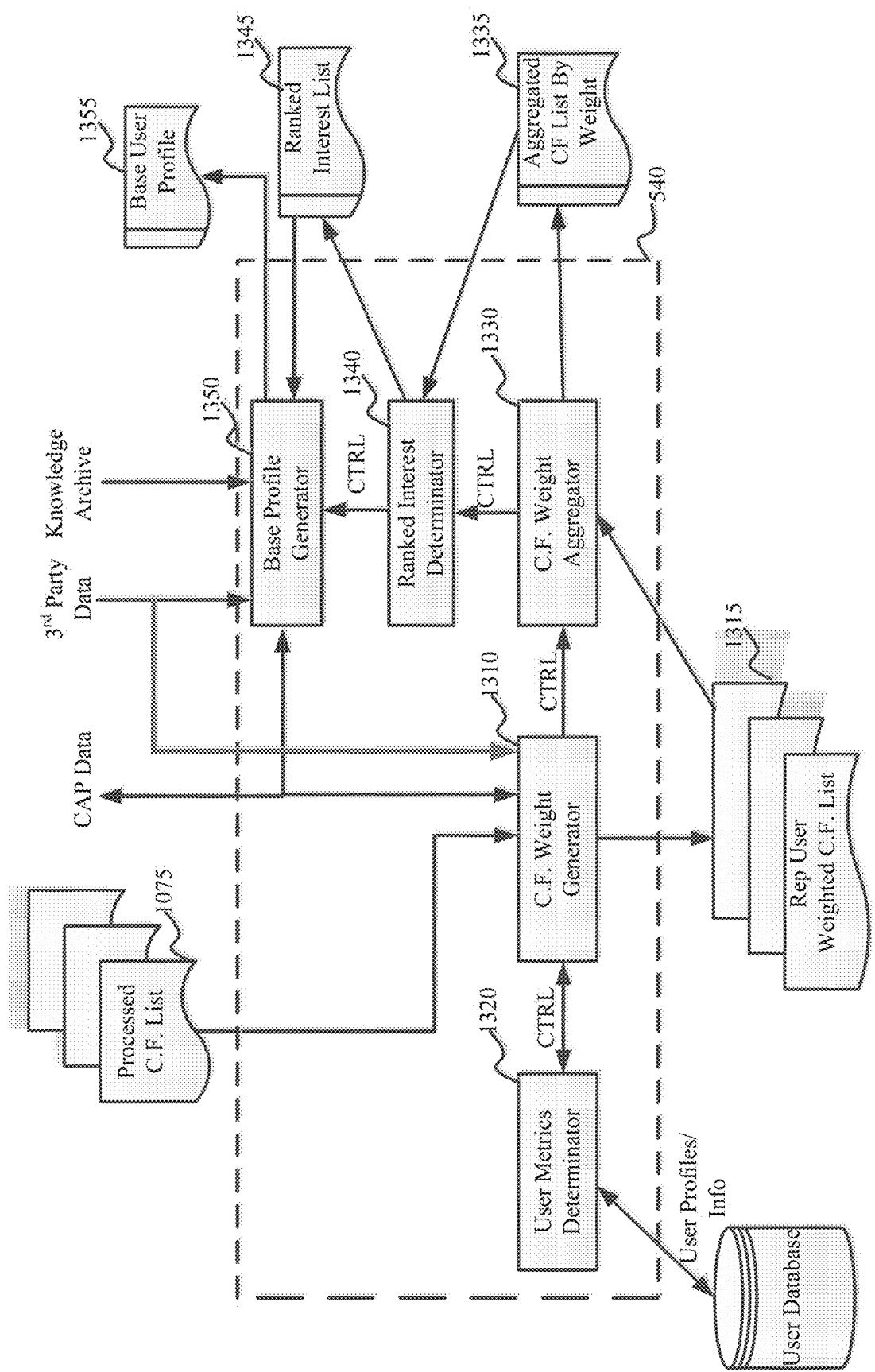
FIG. 13 depicts an exemplary diagram of a base user profile engine, according to an embodiment of the present teaching.

FIG. 13 depicts an exemplary diagram of a base user profile engine shown in FIG. 5, according to an embodiment of the present teaching. It will be described with reference to FIGS. 5 and 10. As shown in this example, the user profile engine 540 may comprise a content feature weight generator 1310, a user metrics determinator 1320, a content feature weight aggregator 1330, a ranked interest determinator 1340, a base profile generator 1350, and/or any other components. As shown, the content feature weight generator 1310 may be configured to obtain the processed content feature list 1075 and generate a representative user weighted content feature list 1315. The content feature weight aggregator 1330 may be configured to obtain the weighted content feature list 1315 generated by the content feature generator 1310 and to generate an aggregated content feature list 1335. Various operations that may be performed by the content feature weight generator 1310 and content feature weight aggregator 1330 will now be described in connection with FIGS. 14-16.

Figure 14:
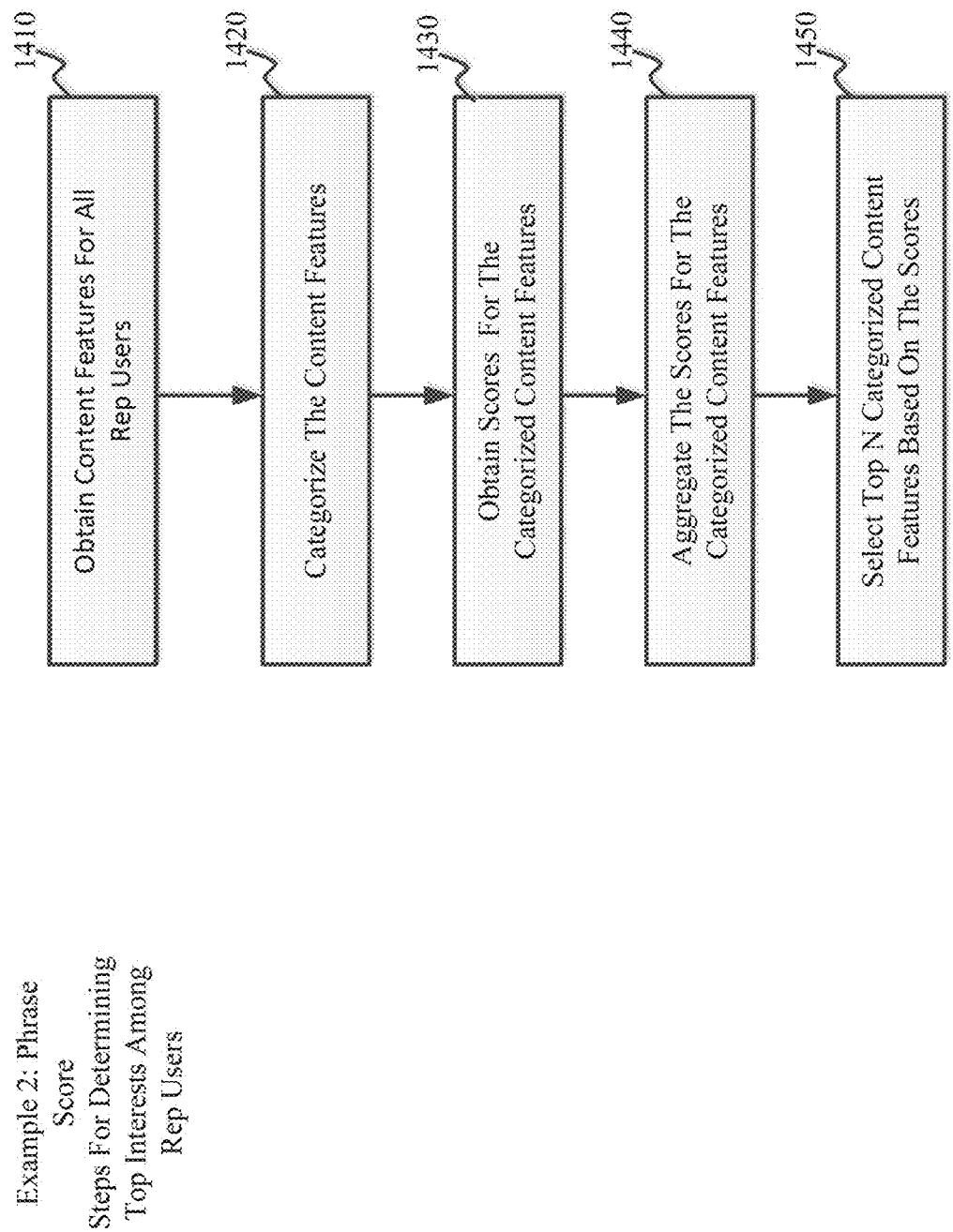
FIG. 14 is a flowchart of an exemplary process for weighting content features using a score, according to an embodiment of the present teaching.

FIG. 14 is a flowchart of an exemplary process for weighting content features using a score, according to an embodiment of the present teaching. The operations illustrated in FIG. 14 are similar to those illustrated in FIG. 12 except at an operation 1430, the score for the categorized content features may be obtained. Using table 3 described above as an example, scores for the corresponding occurrence of the content features may be obtained in operation 1430. At an operation 1440, the obtained scores may be aggregated by the categorized content features. For example, still using table 3 as an example, the aggregation results for the content features listed in table 3 under operation 1440 would be: phrase #1—0.5; phrase #2—0.6; phrase #5—1.1; and phrase #17—1.3. Based on the aggregated scores for the categorized content features, at an operation 1450, N number of content features with top aggregated scores may be selected as ranked interests for building the base user profile.

Figure 15:
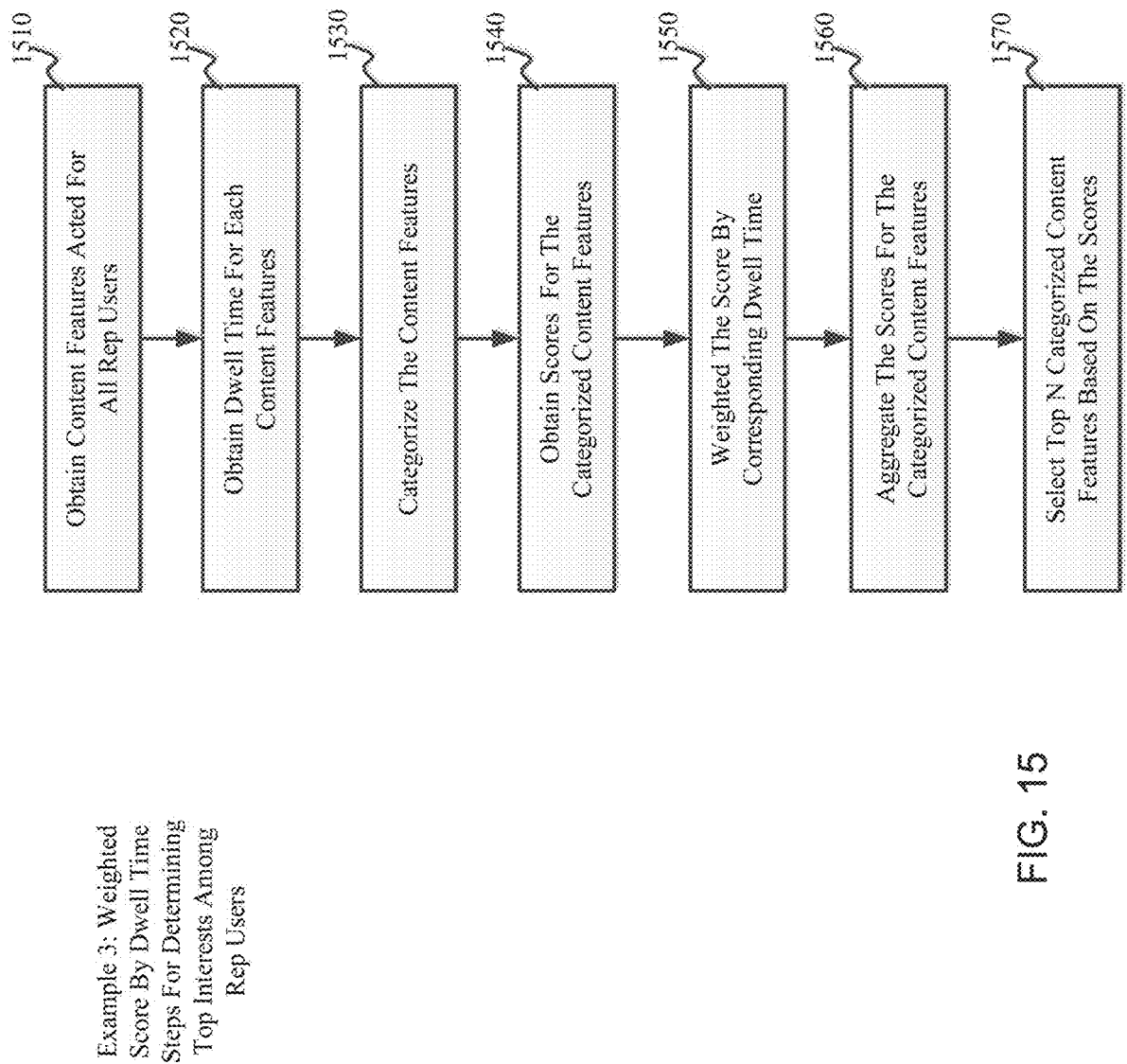
FIG. 15 is a flowchart of an exemplary process weighting content features using weighted score by dwell time, according to an embodiment of the present teaching.

FIG. 15 is a flowchart of an exemplary process of weighting content features using weighted score by dwell time, according to an embodiment of the present teaching. The operations illustrated in FIG. 15 are similar to those illustrated in FIG. 14 except at an operation 1520, dwell time information may be obtained for each content features obtained in operation 1510. As described above, the dwell time information may be captured in the activity information obtained for the representative users. For example, for the individual content features 1065, time duration in which the corresponding representative users "dwell" on the content features may be obtained. For instance, table 4 below illustrates dwell time for individual content features may be obtained.

TABLE 4

Examples of dwell time for the individual content features

| Phrase #1: e.g., xxx | UID000X: 50% - 10 min . . . |
|---|---|
| Phrase #2: e.g., aaa | UID000X: 20% - 5 min, |
|  | UID00XX: 40% - 15 min, . . . |
| Phrase #5: e.g., kkk | UID00XX: 50% - 2 min; |
|  | UID000Y: 60% - 5 min . . . |
| . . . | . . . |
| Phrase #17: e.g., ddd | UID00XX: 90% - 8 min; |
|  | UID000Y: 40% - 5 min . . . |

At an operation 1550, the score for the individual content features may be weighted by corresponding dwell time. For example, without limitation, operation 1550 may involve assigning corresponding adjustment value to the dwell time for the content features in a linear fashion. In one implementation, each minute of the dwell time may be assigned 1% adjustment score, and the total adjustment score may be added to the CAP score. Using table 4 as an example, the weighted score by the dwell time in operation 1560 would be: phrase #1—0.5+0.1=0.6; phrase #2—0.6+0.2=0.8; phrase #5—1.1+0.07=1.107; and phrase #17—1.3+0.13=1.43. Based on the aggregated scores for the categorized content features, at an operation 1570, N number of content features with top aggregated scores may be selected as ranked interests for building the base user profile.

Figure 16:
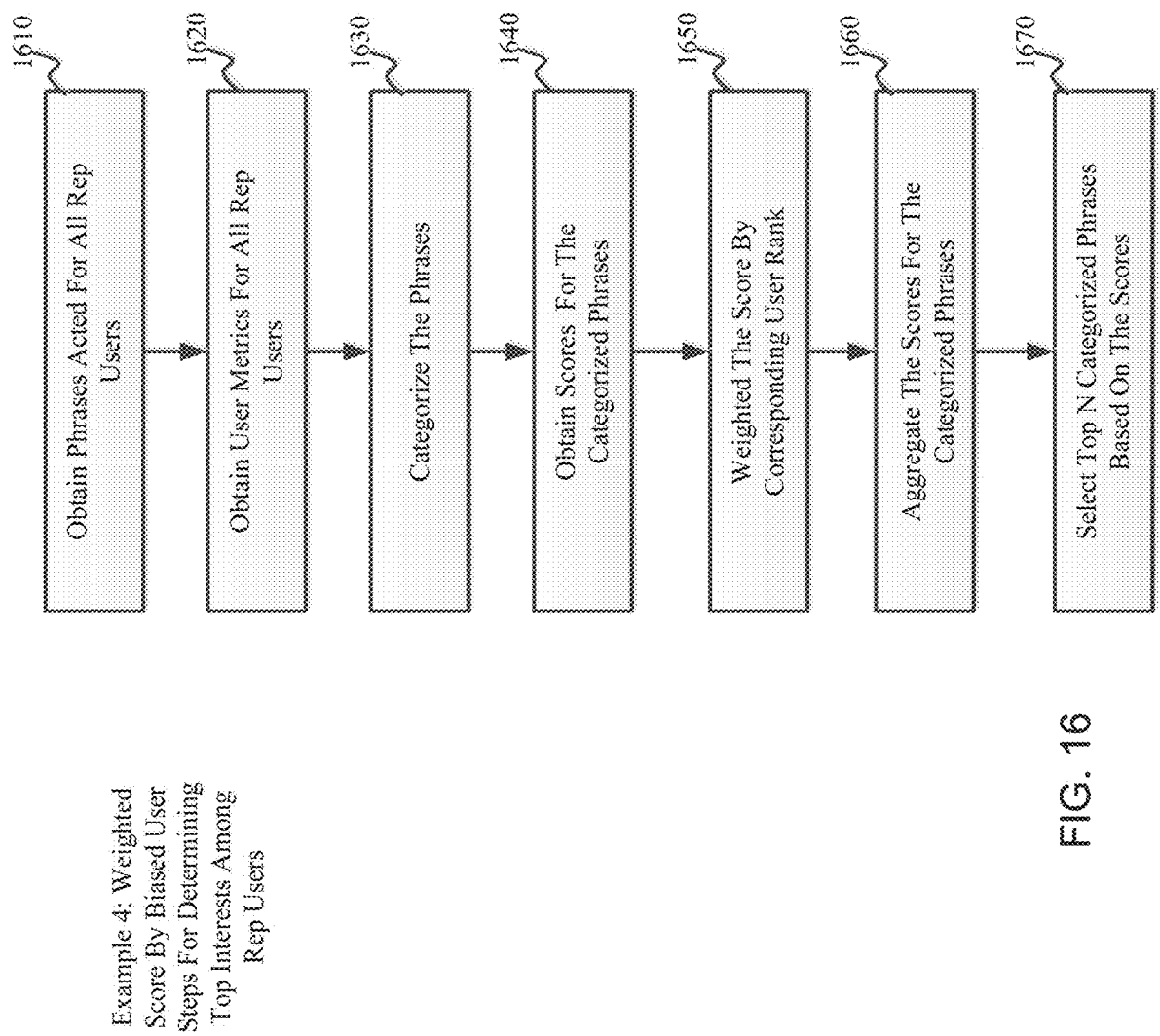
FIG. 16 is a flowchart of an exemplary process for an exemplary process weighting content features using weighted score based on user metrics, according to an embodiment of the present teaching.

FIG. 16 is a flowchart of an exemplary process for an exemplary process weighting content features using weighted score based on user metrics, according to an embodiment of the present teaching. The operations illustrated in FIG. 16 are similar to those illustrated in FIG. 14 except at an operation 1620, user metric information may be obtained for representative users corresponding to the content features obtained in operation 1610. The user metrics obtained in operation 1620 may include user experience, activity level, user reputation, user power, user ranking, user age, user education level, and/or any other user metric. For the user metrics obtained in operation 1620, bias factors may be assigned. For example, a bias factor may be assigned to user experience such that user with one year of user experience (e.g., as measured by the length of user account since created) may have a base bias factor 1, with each month increasing from the one year, an addition 0.1 may be added to the base bias factor. That is, if a given representative user has 15 month of experience, a bias factor 1.5 may be assigned to the content feature score(s) corresponding to that user. Similarly with each month increasing from the one year, a 0.1 may be subtracted from the base bias factor. That is, if a given representative user has 8 month of experience, a bias factor 0.6 may be assigned to the content feature score(s) corresponding to that user. The bias factor for the individual representative users may be used in operation 1650 to weight the content feature score. For example, if a content feature has a score of 60% with a corresponding representative user having a bias factor 2, then the content feature score may be weighted as 2×0.6=1.2; and if the corresponding representative user has a bias factor of 0.8, then the content feature score may be weighted as 0.8×0.6=0.48. Based on the aggregated scores for the categorized content features, at an operation 1670, N number of content features with top aggregated scores may be selected as ranked interests for building the base user profile.

Returning FIG. 13, user metrics determinator 1320 may be configured to determine user metrics for the representative users in the list 1075 based on the user profiles and/or user information of the representative users. The 1340 may be configured to obtain the aggregated content feature list created by the content feature weight aggregator 1330, and generate a ranked interest list 1345. The base profile generator 1350 may be configured to receive the ranked interest list 1345, $3^{rd}$ party data, knowledge archive, CAP data, and other inputs to generate a base user profile 1355. In one example, the base user profile 1355 may include information indicating the top N interests in the ranked interest list 1345. Such information may indicate interests of the representative users.

Figure 17:
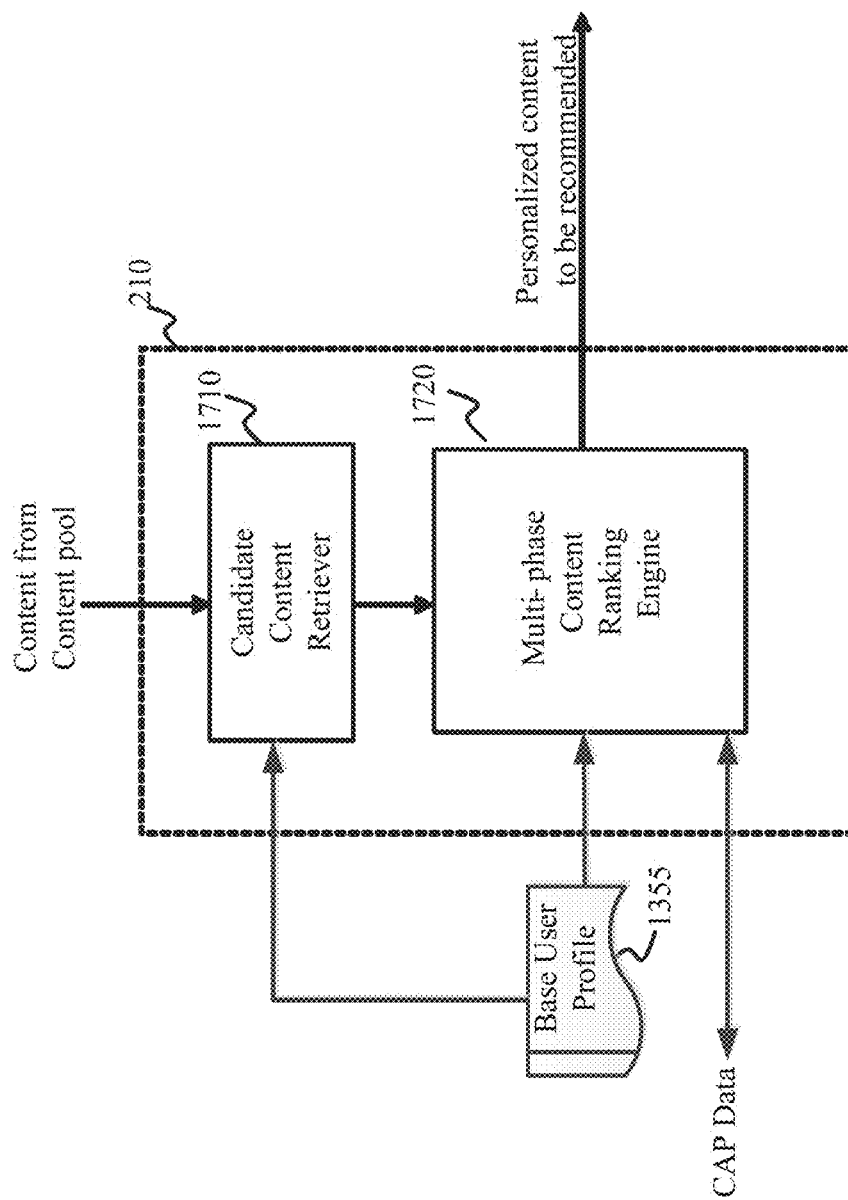
FIG. 17 is a diagram illustrating a content recommendation unit in accordance with an embodiment of the present teaching.

FIG. 17 is a diagram illustrating a content recommendation unit shown in FIG. 1, in accordance with an embodiment of the present teaching. As shown, the content recommendation unit 210 may comprise a multi-phase content ranking engine 1720, a content retriever 1710, and/or any other components. The input to the content ranking unit 210 may base user profile 1355, content from the content pool, CAP data, and/or any other inputs. The candidate content retriever 1710 may be configured to determine content items to be retrieved from the content pool 135 shown in FIG. 1. Such candidate content may be determined in a manner that is consistent with the ranked interest included in the base user profile 1355. For example, without limitation, content items related to those interests may be retrieved in a prioritized fashion in accordance with the ranks of those interests in the base user profile 1355. The multi-phase content ranking unit 1720 may be configured to receive the candidate content from the candidate content retriever 1710 for recommendation and to perform multiple stages of ranking, e.g., relevance based ranking, performance based ranking and/or any other types of ranking. In one implementation, relevance based ranking is performed by the multi-phase content ranking unit 1720 may involve ranking the candidate content items based on a dot product of the scores of the ranked interests and the key phrases included in the candidate content items. For example, without limitation, a candidate item (e.g., an article) may be associated with 3 key phrases and each with a score indicating the relevance of the candidate item to the key phrases: e.g., phrase #1: 40% (relevant), phrase #2: 80% (highly relevant), and phrase #4: 20% (not that relevant). The multi-phase content ranking unit 1720 may be configured to generate a dot product of this phrase list with the score of the ranked interests in the base user profile. In this fashion, individual candidate content items may be assigned a score based on the result of the dot product and ranked based on the score.

Figure 18:
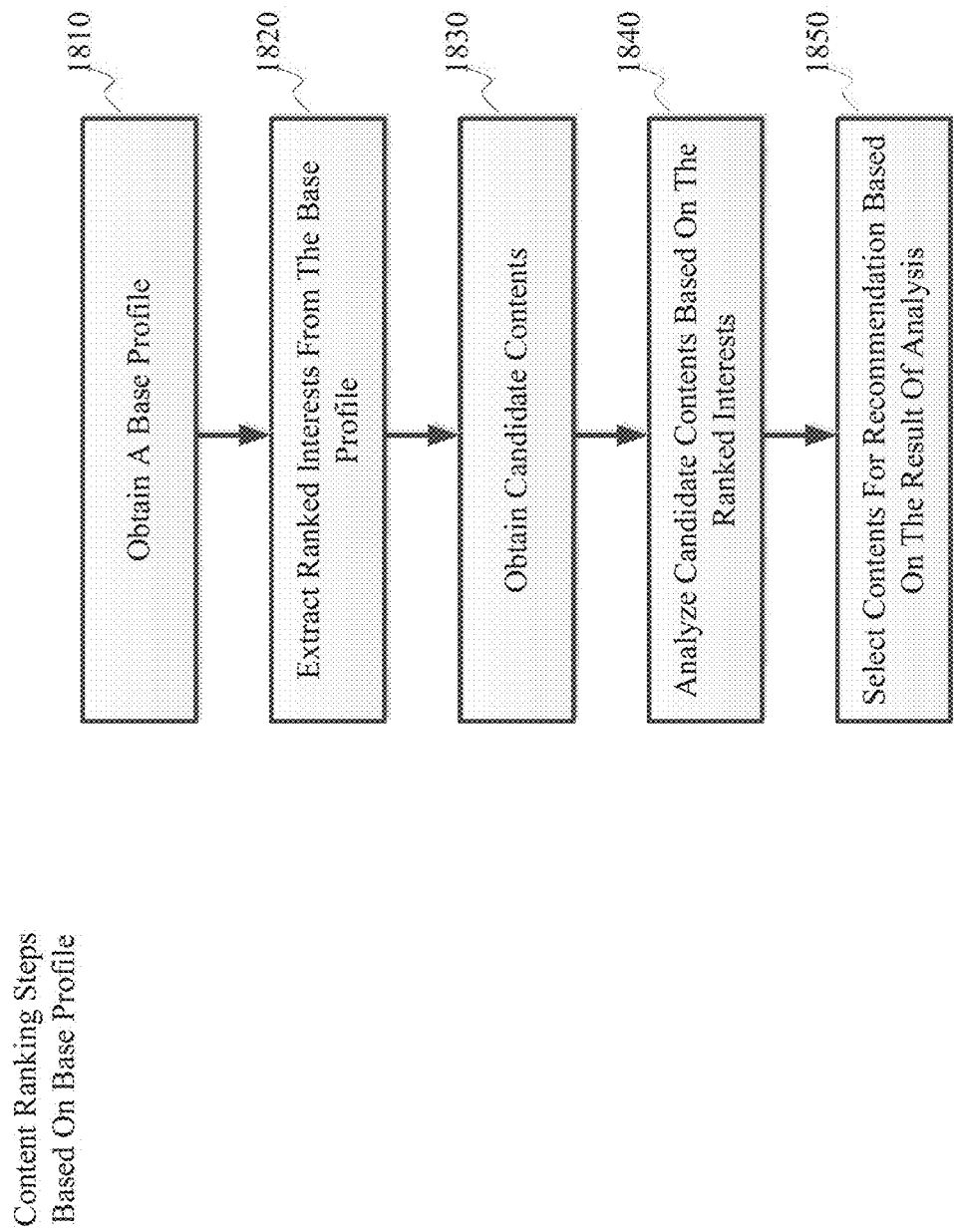
FIG. 18 is a flowchart of an exemplary process for selecting contents for recommendation based on the base user profile, according to an embodiment of the present teaching.

FIG. 18 is a flowchart of an exemplary process for selecting contents for recommendation based on the base user profile, according to an embodiment of the present teaching. At an operation 1810, a base user profile may be obtained for a user whose interest(s) have not been identified. At an operation 1820, ranked interests may be extracted from the base user profile obtained in operation 1810. At an operation 1830, candidate contents may be obtained in accordance with the ranked interests extracted in operation 1830. At an operation 1840, the candidate contents may be analyzed based on the ranked interests and any other data as described herein. At an operation 1850, contents may be selected for recommendation based on the result of the analysis performed in operation 1840.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 19:
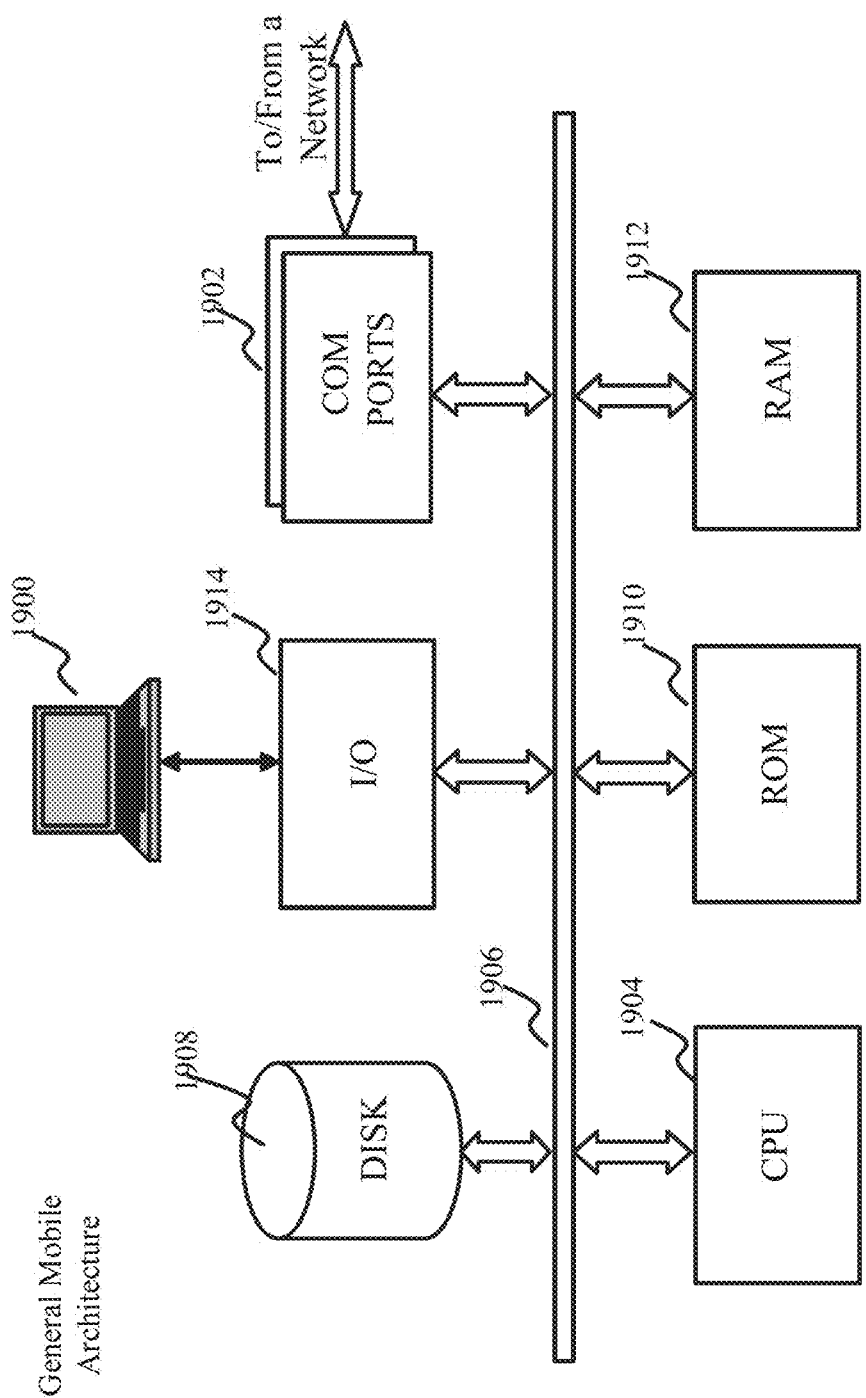
FIG. 19 depicts a general computer architecture on which the present teaching can be implemented.

FIG. 19 depicts a general computer architecture on which the present teaching can be implemented and has a functional block diagram illustration of a computer hardware platform that includes user interface elements. The computer may be a general-purpose computer or a special purpose computer. This computer 1900 can be used to implement any components of the unknown interest identifier architecture as described herein. Different components of the system in the present teaching can all be implemented on one or more computers such as computer 1900, via its hardware, software program, firmware, or a combination thereof. Although only one such computer is shown, for convenience, the computer functions relating to the target metric identification may be implemented in a distributed fashion on a number of similar platforms, to distribute the processing load.

The computer 1900, for example, includes COM ports 1902 connected to and from a network connected thereto to facilitate data communications. The computer 1900 also includes a central processing unit (CPU) 1904, in the form of one or more processors, for executing program instructions. The exemplary computer platform includes an internal communication bus 1906, program storage and data storage of different forms, e.g., disk 1908, read only memory (ROM) 1910, or random access memory (RAM) 1912, for various data files to be processed and/or communicated by the computer, as well as possibly program instructions to be executed by the CPU. The computer 1900 also includes an I/O component 1914, supporting input/output flows between the computer and other components therein such as user interface elements 1916. The computer 1900 may also receive programming and data via network communications.

Figure 20:
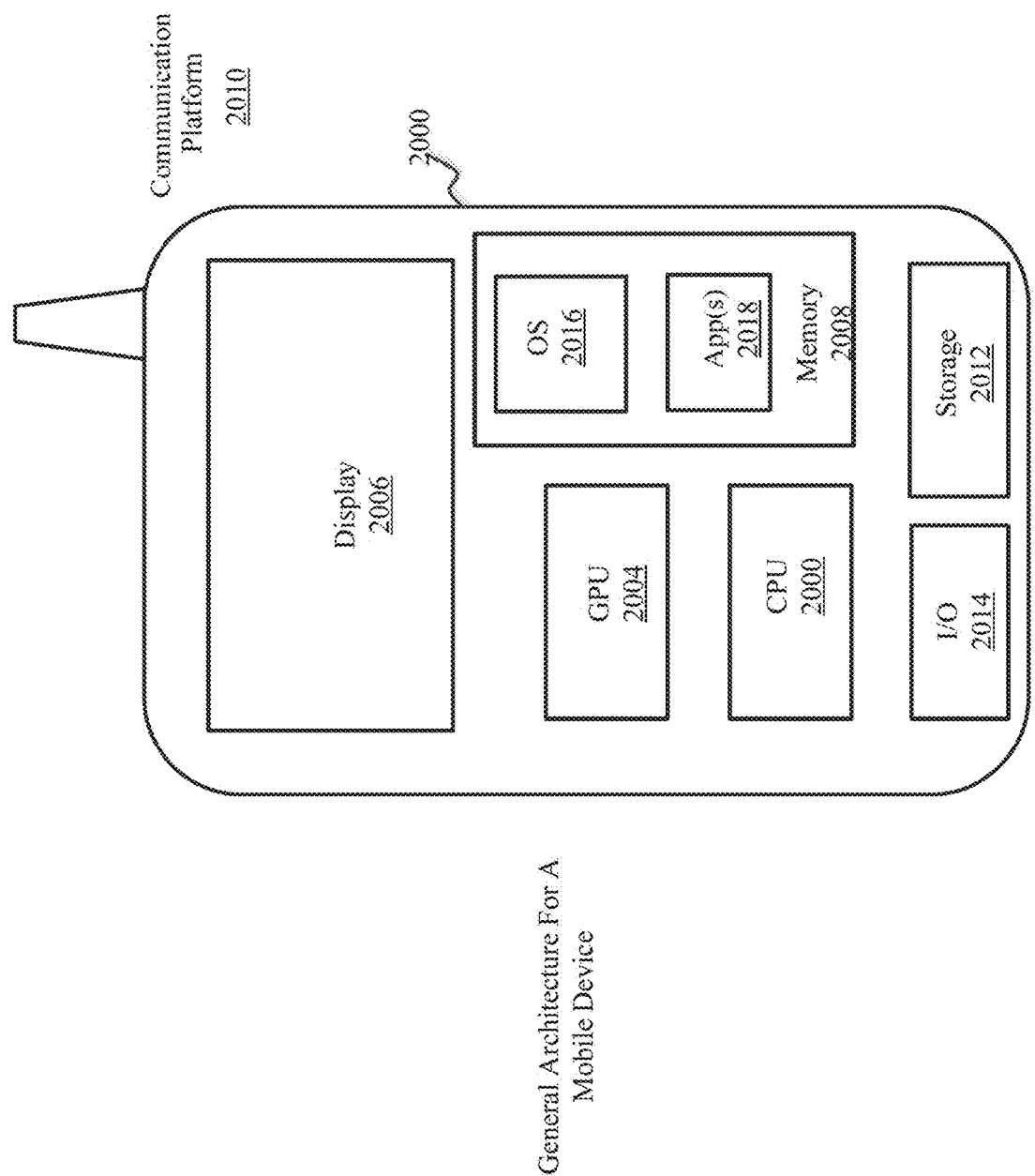
FIG. 20 depicts a mobile device architecture on which the present teaching can be implemented.

FIG. 20 depicts a general mobile device architecture on which the present teaching can be implemented. In this example, the user device on which personalized content is presented is a mobile device 2000, including but is not limited to, a smart phone, a tablet, a music player, a handled gaming console, a global positioning system (GPS) receiver. The mobile device 2000 in this example includes one or more central processing units (CPUs) 2002, one or more graphic processing units (GPUs) 2004, a display 2006, a memory 2008, a communication platform 2010, such as a wireless communication component, storage 2012, and one or more input/output (I/O) devices 2014. Any other suitable component, such as but not limited to a system bus or a controller (not shown), may also be included in the mobile device 2000. As shown in FIG. 20, a mobile operating system 2016, e.g., iOS, Android, Windows Phone, etc., and one or more applications 2018 may be loaded into the memory 2008 from the storage 2012 in order to be executed by the CPU 2002. The applications 2018 may include a browser or any other suitable mobile apps for receiving and rendering personalized content streams on the mobile device 2000. Execution of the applications 2018 may cause the mobile device 2000 to perform the processing as described above. For example, the display of personalized content to the user may be made by the GPU 2004 in conjunction with the display 2006. User interactions with the personalized content streams may be achieved via the I/O devices 2014 and provided to user engagement assessment system 1200 via the communication platform 2010.

Hence, aspects of the method of discovering user unknown interest from known interests, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated components thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for recommending content to a user, the method being implemented on a computing device having at least one processor, storage, and a communication interface connected to a network, the method comprising:
   creating a base user profile for a user in an event that interest information identifying one or more interests of the user is not available, the base user profile including information indicating a plurality of ranked interests of a set of other users, wherein creating the base user profile comprises:
      selecting the set of other users based on selection criteria which include a frequency with which each of the other users interacts with a content recommendation system, wherein each of the selected set of other users is assigned a bias factor determined based on an amount of time since a user account was created for the selected other user with the content recommendation system;
      obtaining activity information of the selected set of other users, the activity information indicating activities engaged by the other users; and
      analyzing the obtained activity information of the selected set of other users to determine the plurality of ranked interests of the set of other users based on weights associated with each of the selected set of other users, wherein the weights are determined based on the bias factor of each of the selected set of other users, features extracted from content items with which the activity information is associated, and user engagement information associated with the selected set of other users; and
   recommending content to the user based on the base user profile.

2. The method of claim 1, further comprising:
   building a content pool comprising a plurality of content items, wherein each of the plurality of content items is selected for inclusion in the content pool based on a measure of its popularity with respect to one or more of the other users; and
   retrieving a set of candidate content items from the content pool based on scores associated with the plurality of ranked interests and on a relevancy score associated with each of one or more key terms extracted from each of the candidate content items, wherein:
      the content recommended to the user comprises the retrieved set of candidate content items, and
      the content comprises the content items with which the activity information is associated.

3. The method of claim 2, wherein the retrieval of the set of candidate content items is further based on discovered interests of the user.

4. The method of claim 2, further comprising:
dynamically determining a pace at which content in the content pool is updated based on at least one of entered search terms, declared interests, or user activity with respect to content.

5. The method of claim 2, further comprising:
updating the content pool by purging content items based on a performance characteristic of the to-be-purged content items or on a time stamp associated with the purged content item satisfying a criterion.

6. The method of claim 2, further comprising:
responsive to a new content source becoming available for crawling, updating the content pool.

7. The method of claim 2, wherein the content pool is organized as a tiered system by comprising both a general content pool and a personalized content pool for each of different users, and wherein each personalized content pool comprises links, pointers, or indices that provide references to where a given content item is stored in the general content pool.

8. The method of claim 2, wherein the set of candidate content items are retrieved from the content pool based on a dot product of the scores associated with the plurality of ranked interests with a relevancy score associated with each of the one or more extracted key terms.

9. The method of claim 1, wherein the user engagement information comprises user metrics including at least one of user experience, activity level, user reputation, user power, user ranking, user age, or user education level.

10. The method of claim 1, wherein the set of other users are selected from a plurality of other users that interact with the content recommendation system based on the frequency with which each of the other users interact with the content recommendation system meeting a threshold log-in frequency of the content recommendation system.

11. A non-transitory, computer-readable medium having information recorded thereon for recommending content to a user wherein the information, when read by at least one processor, effectuate operations comprising:
creating a base user profile for a user in an event that interest information identifying one or more interests of the user is not available, the base user profile including information indicating a plurality of ranked interests of a set of other users, wherein creating the base user profile comprises:
selecting the set of other users based on selection criteria which include a frequency with which each of the other users interacts with a content recommendation system, wherein each of the selected set of other users is assigned a bias factor determined based on an amount of time since a user account was created for the selected other user with the content recommendation system;
obtaining activity information of the selected set of other users, the activity information indicating activities engaged by the other users; and
analyzing the obtained activity information of the selected set of other users to determine the plurality of ranked interests of the set of other users, based on weights associated with each of the selected set of other users, wherein the weights are determined based on the bias factor of each of the selected set of other users, features extracted from content items with which the activity information is associated, and user engagement information associated with the selected set of other users; and
recommending content to the user based on the base user profile.

12. A system for recommending content to a user, the system comprising:
storage;
a communication platform connected to a network; and
one or more processors programmed to execute computer program instructions that, when executed, cause the one or more processors to:
create a base user profile for a user in an event that interest information identifying one or more interests of the user is not available, the base user profile including information indicating a plurality of ranked interests of a set of other users, wherein creating the base user profile comprises:
selecting the set of other users based on selection criteria which include a frequency with which each of the other users interacts with a content recommendation system, wherein each of the selected set of other users is assigned a bias factor determined based on an amount of time since a user account was created for the selected other user with the content recommendation system;
obtaining activity information of the selected set of other users, the activity information indicating activities engaged by the other users; and
analyzing the obtained activity information of the selected set of other users to determine the plurality of ranked interests of the set of other users, based on weights associated with each of the selected set of other users, wherein the weights are determined based on the bias factor of each of the selected set of other users, features extracted from content items with which the activity information is associated, and user engagement information associated with the selected set of other users; and
recommend content to the user based on the base user profile.

13. The system of claim 12, wherein the one or more processors are further caused to:
build a content pool comprising a plurality of content items, wherein each of the plurality of content items is selected for inclusion in the content pool based on a measure of its popularity with respect to one or more of the other users; and
retrieve a set of candidate content items from the content pool based on scores associated with the plurality of ranked interests and on a relevancy score associated with each of one or more key terms extracted from each of the candidate content items, wherein:
the content recommended to the user comprises the retrieved set of candidate content items, and
the content comprises the content items with which the activity information is associated.

14. The system of claim 13, wherein the retrieval of the set of candidate content items is further based on discovered interests of the user.

15. The system of claim 13, wherein the one or more processors are further caused to:
dynamically determine a pace at which content in the content pool is updated based on at least one of entered search terms, declared interests, or user activity with respect to content.

16. The system of claim 13, wherein the one or more processors are further caused to:
update the content pool by purging content items based on a performance characteristic of the to-be-purged content items or on a time stamp associated with the purged content item satisfying a criterion.

17. The system of claim 13, wherein the one or more processors are further caused to:
responsive to a new content source becoming available for crawling, update the content pool.

18. The system of claim 13, wherein the content pool is organized as a tiered system by comprising both a general content pool and a personalized content pool for each of different users, and wherein each personalized content pool comprises links, pointers, or indices that provide references to where a given content item is stored in the general content pool.

19. The system of claim 13, wherein the set of candidate content items are retrieved from the content pool based on a dot product of the scores associated with the plurality of ranked interests with a relevancy score associated with each of the one or more extracted key terms.

\* \* \* \* \*